United States Patent
Kita et al.

(10) Patent No.: US 9,057,143 B2
(45) Date of Patent: Jun. 16, 2015

(54) ALUMINUM BASE DIE MATERIAL FOR STAMPER, ALUMINUM BASE DIE FOR STAMPER AND STAMPER

(75) Inventors: Hiroaki Kita, Inazawa (JP); Kota Shirai, Shizuoka (JP); Hisakazu Ito, Shizuoka (JP)

(73) Assignees: Nippon Light Metal Company, Ltd., Tokyo (JP); Mitsubishi Rayon Co., Ltd., Tokyo (JP)

( * ) Notice: Subject to any disclaimer, the term of this patent is extended or adjusted under 35 U.S.C. 154(b) by 364 days.

(21) Appl. No.: 13/395,252

(22) PCT Filed: Sep. 10, 2010

(86) PCT No.: PCT/JP2010/065613
§ 371 (c)(1),
(2), (4) Date: Mar. 9, 2012

(87) PCT Pub. No.: WO2011/030850
PCT Pub. Date: Mar. 17, 2011

(65) Prior Publication Data
US 2012/0171427 A1     Jul. 5, 2012

(30) Foreign Application Priority Data
Sep. 11, 2009   (JP) .................................. 2009-210054

(51) Int. Cl.
*C22C 21/06*      (2006.01)
*C22C 21/00*      (2006.01)
*B32B 3/00*       (2006.01)
(Continued)

(52) U.S. Cl.
CPC ......... *C25D 11/16* (2013.01); *Y10T 428/24479* (2015.01); *B29C 33/38* (2013.01); *B29K 2905/02* (2013.01); *C22C 21/06* (2013.01)

(58) Field of Classification Search
CPC ........ C25D 11/16; C22C 21/06; B29C 33/38; B29K 2905/02
USPC ........... 428/156; 425/470; 420/542, 543, 546, 420/547
See application file for complete search history.

(56) References Cited

U.S. PATENT DOCUMENTS 2,628,899 A * 2/1953 Willmore ...................... 420/543
4,235,646 A * 11/1980 Neufeld et al. ............... 148/551
(Continued)

FOREIGN PATENT DOCUMENTS

JP   2005-156695   6/2005
JP   2005-232487   9/2005
(Continued)

*Primary Examiner* — Maria Veronica Ewald
*Assistant Examiner* — Nathan Van Sell
(74) *Attorney, Agent, or Firm* — Morgan, Lewis & Bockius LLP

(57) ABSTRACT

The present invention relates to an aluminum die base material for a stamper having a component composition that contains 0.5% by weight to 3.0% by weight of Mg, the total amount of elements other than Mg, including unavoidable impurities, is 500 ppm or less, and the remainder is composed of Al, and a forged structure in which the average crystal grain size is 1000 μm or less and the surface area ratio of second phase particles is 0.10% or less. According to the present application, a stamper can be provided in which, together with the crystal grain size of the aluminum being refined, the formation of second phase particles is inhibited, surface irregularities attributable to mirrored surface polishing are reduced, and a uniform relief pattern is formed by anodic oxidation treatment.

10 Claims, 9 Drawing Sheets

(51) Int. Cl.
*C25D 11/16* (2006.01)
*B29C 33/38* (2006.01)

(56) References Cited

U.S. PATENT DOCUMENTS

| | | | | |
|---|---|---|---|---|
| 4,847,048 A | * | 7/1989 | Nishi et al. | 420/547 |
| 4,976,918 A | * | 12/1990 | Nishi et al. | 420/546 |
| 5,240,522 A | * | 8/1993 | Tanaka et al. | 148/693 |
| 2004/0140025 A1 | * | 7/2004 | Kamat et al. | 148/690 |
| 2007/0084527 A1 | * | 4/2007 | Ferrasse et al. | 148/550 |
| 2009/0194914 A1 | | 8/2009 | Uozu et al. | |
| 2010/0243458 A1 | | 9/2010 | Kojima et al. | |

FOREIGN PATENT DOCUMENTS

| | | |
|---|---|---|
| WO | 2008/001847 | 1/2008 |
| WO | 2009/054513 | 4/2009 |

* cited by examiner

100mm

ALUMINUM BASE DIE MATERIAL FOR STAMPER, ALUMINUM BASE DIE FOR STAMPER AND STAMPER

TECHNICAL FIELD

The present invention relates to an aluminum base die material for a stamper that inhibits the frequency of occurrence of treated film defects for fabricating anti-reflective articles and the like using a stamper by fabricating a casting (stamper) in which a relief structure is formed in which anodic oxidation treatment (to also be referred to as "alumite treatment") has been carried out on an aluminum surface, an aluminum base die for a stamper, a stamper using the same, and a production method thereof.

The present application is a national stage of PCT International Application No. PCT/JP2010/065613, filed on Sep. 10, 2010 and claims priority on the basis of Japanese Patent Application No. 2009-210054 filed in Japan on Sep. 11, 2009, the contents of which are incorporated herein by reference.

BACKGROUND ART

Research has been conducted in recent years for reducing levels of reflection return light of liquid crystal screens of televisions and cell phones by providing an anti-reflective structure having a fine relief structure in which the period of the relief structure is controlled to be equal to or less than the wavelength of visible light. As an example of a method used for this purpose, a fine relief structure is formed by treating aluminum with alumite and the relief portion is transferred to a molding material such as a resin to produce an anti-reflective article. The relief pattern formed by alumite treatment has been reported to have a pyramid form such as that of cones or rectangular cones.

In the case of treating aluminum with alumite and producing a transfer by using the surface as a casting (stamper), since the surface of the stamper is directly reflected on the transfer, the quality of the stamper surface is important. Examples of factors that affect this surface quality include second phase particles, crystal grain size and crystal orientation in the material, and mirrored surface polishability of the material. There are considered to be offsetting aspects between the second phase particles and other parameters (crystal grain size, crystal orientation and mirrored surface polishability).

In general, defects occur during alumite treatment when second phase particles having an equivalent diameter equal to or greater than roughly the wavelength of visible light are present on the surface. These defects are manifest as surface irregularities of the stamper transfer, and are undesirable since they impair the absorption or scattering of reflected light. On the other hand, even in the case second phase particles smaller than the wavelength of visible light are present on the surface, they can also cause defects during alumite treatment. If these defects are present continuously or are intermittently present at an interval equal to or less than roughly the wavelength of visible light, the same problems as described above occur, thereby making this undesirable. In addition, in the case second phase particles have an equivalent diameter equal to or greater than the wavelength of visible light and are scattered on the surface at a short distance equal to or greater than the equivalent diameter, defects similarly occur during alumite treatment. However, disturbances in absorption or scattering of reflected light attributable thereto are not recognizable to the naked eye.

Consequently, second phase particles that can cause defects in alumite-treated films are preferably present in aluminum at as low a level as possible. The use of pure aluminum that contains low levels of added elements and impurities capable of forming these second phase particles has been determined to allow the obtaining of a fine relief structure free of treated film defects. Consequently, pure aluminum has come to be used as a stamper material (see, for example, paragraph [0025] of Patent Document 1).

In addition, Patent Document 2 describes to the effect that anodized porous alumina having superior regularity can be produced by forming an aluminum alloy film containing 0.5% by weight to 10% by weight of Mg on an aluminum substrate, and then carrying out alumite treatment on the aluminum alloy film.

PRIOR ART DOCUMENTS

Patent Documents

[Patent Document 1] Japanese Unexamined Patent Application, First Publication No. 2005-156695
[Patent Document 2] Japanese Unexamined Patent Application, First Publication No. 2005-232487

SUMMARY OF THE INVENTION

Problems to be Solved by the Invention

Crystal grains of highly pure aluminum easily increase in size during the casting step, deformation processing and annealing step, and visibly conspicuous coarse crystal grains form a similar grain boundary pattern on the surface of alumite as well. As a result, this pattern also ends up being transferred to the transfer produced by the stamper, thereby impairing appearance.

Namely, since crystal grains easily become coarse in highly pure aluminum, rolling, extruding or forging and the like are carried out to increase the fineness of patterns caused by these crystal grains and make them uniform. However, since deformation processing methods such as rolling and extruding are limited to a single processing direction, crystal patterns in the form of lines extending in the direction of processing easily occur in processed structures. As a result, similar patterns occur easily in a transfer produced by a stamper. Therefore, in the case of employing deformation processing methods such as rolling or extruding, it is necessary to employ complex processing having two or more processing directions.

On the other hand, in the case of forging, the processed structure can be controlled by freely interchanging the processing direction. In addition, the degree of processing is determined by the dimensions before and after processing in the cases of rolling and extruding. On the other hand, forging theoretically makes it possible to obtain an infinite degree of processing by repeatedly interchanging the processing direction while inserting annealing. Accordingly, processing by forging is preferable.

Furthermore, in the case of carrying out recrystallization by combining cold processing and annealing, it is generally known that the application of a greater degree of cold processing facilitates the obtaining of finer crystal grains, and forging is preferable with respect to this point as well since it allows the obtaining of a greater degree of processing.

However, even in the case of fine crystal grains obtained by forging as described above, in the case remnants of coarse crystal grains are present during casting prior to forging (see FIG. 1), these remnants remain in the form of unevenness in the crystal orientation after forging (see FIG. 2). Consequently, although it is naturally important to refine crystal grains after forging, it is also necessary to refine the crystal grains of the ingot serving as the material thereof.

In general, a forged structure can be refined by adding a refiner (such as an Al—Ti—B-based refiner) to a melt immediately before forging. However, since refining is difficult in the case of highly pure aluminum, the amount of refiner added increases. As a result, an increase in second phase particles (such as $TiB_2$) attributable to the refiner ends up impairing surface quality of the alumite surface.

In addition, since highly pure aluminum having a low Mg (magnesium) content is soft, it has inferior machining processability and polishability, and makes it difficult to impart a smooth finish to the surface of an aluminum base die. Since surface irregularities that remain after machining and polishing also remain on the surface following alumite treatment, this leads to an increase in finishing machining and polishing costs.

However, in the aforementioned Patent Document 2, anodized porous alumina having superior regularity is obtained by adding 0.5% by weight to 10% by weight of Mg. However, since Patent Document 2 is achieved by sputtering an Mg-containing aluminum alloy film, special devices are required when forming a stamper in the shape of a roll, thereby resulting in increased costs. In addition, since the amount of Mg added is comparatively large at as much as 10% by weight, the amount of second phase particles cannot be controlled.

The present invention was proposed in order to solve offsetting problems as described above. An object of the present invention is to enable a reduction in the number of deformation processing steps and annealing, inhibit the formation of second phase particles, and reduce surface irregularities caused by mirrored surface polishing by refining crystal grains of aluminum during forging. As a result, an object of the present invention is to provide an aluminum base die for a stamper enabling the formation of a uniform relief pattern free of directivity following anodic oxidation treatment, and a stamper that uses the aluminum base die at low cost.

Means for Solving the Problems

The present application has the following aspects for solving the aforementioned problems.

[1] An aluminum base die material for a stamper having a component composition that contains 0.5% by weight to 3.0% by weight of Mg, the total amount of elements other than Mg, including unavoidable impurities, is 500 ppm or less, and the remainder is composed of Al, and a forged structure in which the average crystal grain size is 1000 μm or less and the surface area ratio of second phase particles is 0.10% or less.

[2] The aluminum base die material for a stamper described in claim 1, wherein the content of Fe as unavoidable impurity is 200 ppm or less and the content of Si is 100 ppm or less.

[3] The aluminum base die material for a stamper described in [1] or [2], wherein elements other than Mg, including the unavoidable impurities, are contained in excess of 10 ppm.

[4] An aluminum base die for a stamper having a component composition that contains 0.5% by weight to 3.0% by weight of Mg, the total amount of elements other than Mg, including unavoidable impurities, is 500 ppm or less, and the remainder is composed of Al, and a metal structure in which the average crystal grain size is 1000 μm or less and the surface area ratio of second phase particles is 0.10% or less.

[5] The aluminum base die for a stamper described in [4] wherein the content of Fe as an unavoidable impurity is 200 ppm or less and the content of Si is 100 ppm or less.

[6] The aluminum base die for a stamper described in [4] or [5] above, wherein elements other than Mg, including the unavoidable impurities, are contained in excess of 10 ppm.

[7] The aluminum base die for a stamper described in any of [4] to [6], wherein the content of Ti is 5 ppm to 20 ppm.

[8] The aluminum base die for a stamper described in any of [4] to [7], having a metal structure in which the average crystal grain size is made to be 100 μm or less by carrying out deformation processing.

[9] The aluminum base die for a stamper described in [4], wherein the deformation processing is forging.

[10] The aluminum base die for a stamper described in any of [4] to [9], further having hardness of 20 HV to 60 HV.

[11] A stamper having an aluminum die base composed of a metal composition having a component composition that contains 0.5% by weight to 3.0% by weight of Mg, the total amount of elements other than Mg, including unavoidable impurities, is 500 ppm or less, and the remainder is composed of Al, and in which the average crystal grain size is 1000 μm or less and the surface area ratio of second phase particles is 0.10% or less, and an aluminum oxide layer having a fine relief structure on the surface thereof.

[12] The stamper described in [11], wherein the aluminum base die contains elements other than Mg, including unavoidable impurities, in excess of 10 ppm.

[13] A production method of the stamper described in [11] or [12], comprising (a) a first oxide film formation step for anodizing the surface of an aluminum base die in an electrolyte solution at a constant voltage and forming an oxide film on the surface thereof, (b) an oxide film removal step for removing the oxide film of the aluminum base die following the first oxide film formation step of (a), and (c) a second oxide film formation step for re-anodizing the aluminum base die in an electrolyte solution following the oxide film removal step of (b), and forming an oxide film having a fine relief structure.

[14] The production method of a stamper described in [13], further comprising (d) a pore size enlargement treatment step for enlarging the diameter of pores by immersing the aluminum base die in a solution that dissolves the oxide film following the second oxide film formation step of (c), (e) a repetition step for re-anodizing the aluminum base die in an electrolyte solution following the pore size enlargement treatment step of (d), and (f) a step for obtaining an oxide film having a fine relief structure by repeating the pore size enlargement treatment step of (d) and the repetition step of (e).

[15] A transparent article having a fine relief structure produced according to the method described in [11].

Furthermore, in the present invention, the content of elements other than Mg, including unavoidable impurities, contained in the aluminum base die material or aluminum base die is limited to 500 ppm or less. Normally, elements such as Fe, Mn, Si, Ti and B are unavoidably contained in aluminum. Among these unavoidable impurities, Ti and B are treated as impurities that are alloy components composing the aluminum base die material or aluminum base die of the present invention. However, these Ti and B and the like are intentionally added on the ppm order in order to refine the crystal structure during forging. Therefore, these elements are described in the manner of "elements other than Mg, including unavoidable impurities" as indicated above.

Effects of the Invention

According to the present invention, as a result of limiting the amount of Mg contained in an aluminum melt to 0.5% by weight to 3.0% by weight, and limiting the total amount of elements other than Mg, including unavoidable impurities, to 500 ppm or less, an aluminum ingot can be obtained in which the average crystal grain size is 1000 μm or less and the surface area ratio of second phase particles is 10% or less. An aluminum base die for a stamper is obtained that has fine, uniformly oriented crystal grains and in which the appearance of second phase articles is inhibited by carrying out deformation processing such as forging on this ingot as necessary. Since this base die has high hardness, a smooth surface can be easily formed by surface polishing. If subsequently subjected to anodic oxidation treatment, a relief transfer surface having a uniform pattern free of directivity can easily be formed. As a result, a highly precise stamper can be provided inexpensively.

EMBODIMENTS OF THE INVENTION

Figure 1:
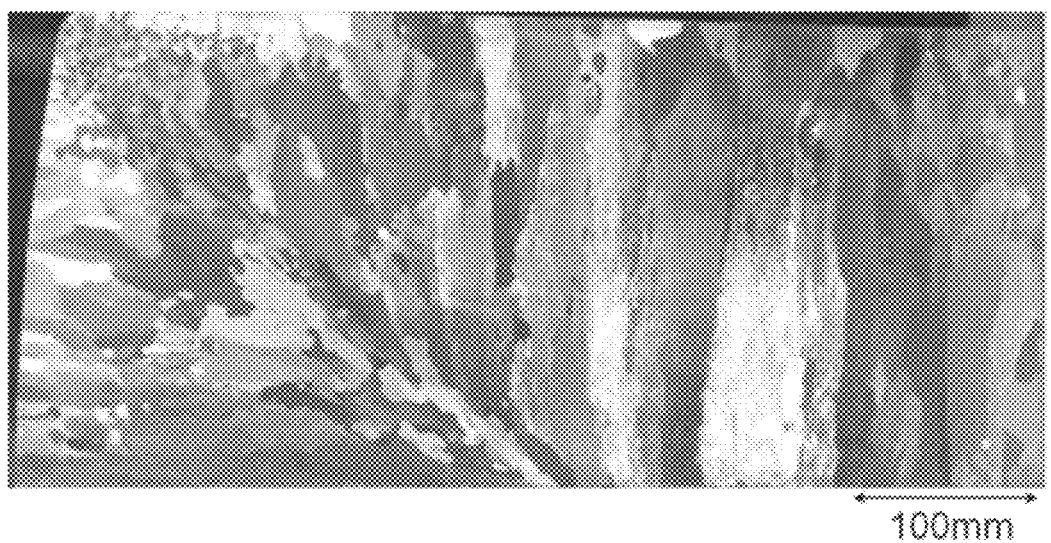
FIG. 1 is a micrograph showing the cast structure of highly pure aluminum.
Figure 2:
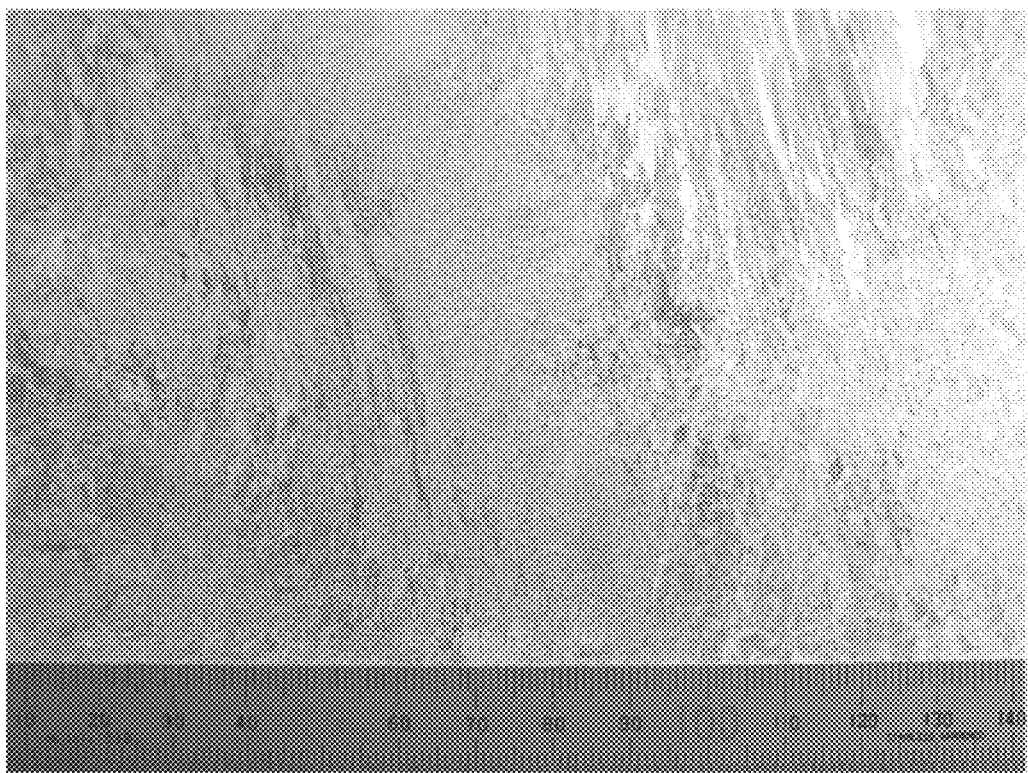
FIG. 2 is a micrograph showing the forged structure of highly pure aluminum.
Figure 3:
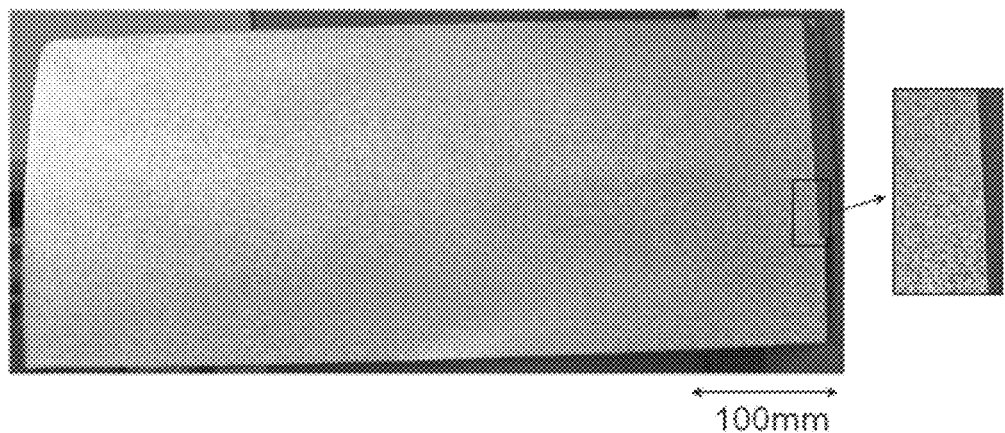
FIG. 3 is a micrograph showing the forged structure of an aluminum alloy.

If highly pure aluminum is selected to inhibit the formation of second phase particles, the grain size of both the cast structure and the recrystallized structure resulting from deformation processing and heat treatment easily increases. In addition, mirrored surface polishability becomes inferior due to the softness of the material. Although alloy elements are generally added to the aluminum to reduce this problem, there is increased susceptibility to the formation of second phase particles attributable to the alloy elements.

Therefore, attention was focused on Mg that has a broad solid solution limit with respect to aluminum and is resistant to the formation of second phase particles, and this Mg was added to aluminum. The addition of Mg can be expected to improve mirrored surface polishability as a result of increasing hardness by strengthening the solid solution, and since Mg is an element that is commonly added to aluminum, there is also the advantage of addition being able to be carried out inexpensively. In addition, less refiner (such as an Al—Ti—B-based refiner) is required in comparison with the large amount of refiner required in the case of highly pure aluminum to refine the crystal grains during casting, thereby making it possible to reduce the number of second phase particles (such as $TiB_2$) caused by the refiner.

However, disadvantages associated with this include other elements such as Si that form second phase particles with Mg causing an increase in the total amount of second phase particles, the possibility of the formation of second phase particles at a specific concentration or temperature range even though Mg is easily put into solid solution, and the addition of Mg and the like causing an increase in deformation resistance, thereby resulting in an increase in costs for deformation processing such as forging.

Consequently, there are upper limits on the concentration of added Mg and the content of elements other than Mg, including unavoidable impurities. In addition, in the case crystal grains is unable to be adequately refined with the addition of Mg alone, it is necessary to optimize the casting method, deformation processing and heat treatment.

Therefore, with the foregoing in view, the inventors of the present invention attempted to determine the optimum range of Mg content as well as the upper limit of the content of other elements.

It was found that, in order to obtain a desired stamper, it is necessary for the aluminum ingot used for the material of the base die to have a component composition that contains 0.5% by weight to 3.0% by weight of Mg, the total amount of elements other than Mg, including unavoidable impurities, is 500 ppm or less, and the remainder is composed of Al, and a cast structure in which the average crystal grain size is 1000 μm or less and the surface area ratio of second phase particles is 0.10% or less.

It was also determined that by subsequently subjecting to deformation processing such as forging as required, a base die is obtained that has a metal structure in which the average crystal grain size is 1000 μm or less and the surface area ratio of second phase particles is 0.10% or less, and that when alumite treatment is carried out on the surface thereof, a stamper can be obtained at low cost that demonstrates a uniform relief pattern free of directivity.

The following provides an explanation of the details thereof, preferable aspects thereof, and a production method thereof.

Composition

Although the purity of a typically used aluminum base metal is 99.7%, even in the case of pure aluminum in which second phase particles ought not to be present, the aluminum contains impurities in excess of 500 ppm. Thus, even a pure aluminum material having a purity of about 99.9% by weight contains a large number of second phase particles, and demonstrates inadequate quality in terms of a stamper surface. Consequently, in the case of the present alloy in which there is increased susceptibility to the formation of second phase particles due to the addition of Mg, it is necessary to use highly pure aluminum as a raw material.

If the amount of Mg added exceeds 3% by weight, there is increased susceptibility to the formation of second phase particles ($Al_3Mg_2$) within the temperature range of 66° C. to 180° C. Although steps included in the production steps, and particularly hot forging and annealing, are carried out at a temperature equal to or higher than the recrystallization temperature (300° C.), the material is exposed, although briefly, to a temperature range of 66° C. to 180° C. during the heating and cooling processes thereof. In addition, this also has an effect on the usage conditions of the stamper in addition to the production steps. For example, in the case the stamper has reached the end of its service life due to deterioration of the alumite surface, the stamper can be regenerated by re-machining the alumite surface to remove the deteriorated surface and then repeating alumite treatment thereon. However, in the case the usage temperature of the stamper is 66° C. to 180° C., the stamper is unable to be regenerated due to the occurrence of second phase particles ($Al_3Mg_2$), thereby leading to increased costs. Alternatively, in the case regenerating the stamper by repeating alumite treatment, the usage temperature of the stamper is limited to that outside the range of 66° C. to 180° C. Consequently, the added concentration of Mg is 3% by weight or less. Moreover, the added amount of Mg is preferably 2% by weight or less in order to reduce forging costs by suppressing deformation resistance attributable to solid solution strengthening by Mg. However, if the added concentration of Mg is excessively low, since there is increased susceptibility to crystal grains following recrystallization becoming coarse due to deformation processing and heat treatment, the added concentration of Mg is preferably 0.5% by weight or more. By making the added concentration of Mg less than 0.5% by weight and increasing the degree of processing by forging, crystal grains can also be refined by increasing the accumulation of strain serving as the driving force of recrystallization. However, this is not preferable since it conversely leads to an increase in forging costs. In this manner, the upper limit of the added amount of Mg is preferably 3% or less, more preferably 2% or less and even more preferably 1.5% or less. The lower limit of the added amount of Mg is preferably 0.5% or more and more preferably 0.6% or more.

Furthermore, due to solid solution strengthening as a result of containing Mg, the hardness of the aluminum ingot increases, and a material having high hardness is obtained even if the degree of processing is reduced during deformation processing. Consequently, in cases not requiring high homogeneity in the manner of an average crystal grain size of 100 μm or less, since crystal grains during casting are refined to 1000 μm or less, surface polishing can be effectively carried out even if the hot forging and/or cold forging to be subsequently described are omitted, and this is then used as an aluminum base die. As a result, since anodic oxidation treatment can be carried out on an aluminum base die for which deformation processing has been omitted or reduced in degree, costs can be reduced. In addition, in cases requiring that crystal grains be refined to about 100 μm, the deformation processing to be subsequently described is carried out. Hardness of the material that has undergone deformation processing after casting is maintained at a high level, mirrored surface polishing can be carried out effectively, and surface irregularities following polishing can be reduced.

Elements that cause the formation of second phase particles alone without significantly being put into solid solution in aluminum (such as Fe or Mn) and elements that precipitate as second phase particles at room temperature even though they are in solid solution at high temperatures (such as Cu) are present as impurities other than Mg, and the total amount thereof is to be 500 ppm or less. As a result, the surface area ratio of second phase particles in an ingot or aluminum base die can be held to 0.10% or less. In particular, together with Si being contained in the largest amount in highly pure aluminum, since it frequently causes contamination by eluting from refractory materials (such as silica ($SiO_2$) or silicon carbide (SiC)) that contact the melt during the casting step, its concentration increases easily. In addition, since second phase particles ($Mg_2Si$) form easily in the presence of Mg as in the present alloy, the Si concentration is preferably 100 ppm or less, more preferably 50 ppm or less and even more preferably 30 ppm or less. Fe is an impurity that is contained in the next largest amount in highly pure aluminum after Si, and hardly enters solid solution at all in aluminum. Consequently, since Fe alone can cause the formation of second phase particles, the concentration thereof is preferably 200 ppm or less, more preferably 150 ppm or less and even more preferably 10 ppm or less. In addition, the Fe concentration is also preferably 3 ppm or more and more preferably 5 ppm or more. If the Fe concentration is less than 3 ppm, it is no longer easy to adjust the aluminum, while also leading to considerable increases in production costs of an aluminum base die for a stamper as well as the stamper, thereby making this undesirable.

Furthermore, it is preferable to add a refiner in order to allow refinement of the cast structure to be carried out easily. Conventionally, refiners have been added in the form of Al—Ti—B-based alloys or Al—Ti—C-based alloys and the like. For example, in the case of adding an Al—Ti—B-based master alloy, the master alloy is added to a degree that the Ti concentration increases by 5 ppm to 100 ppm as compared with that prior to addition, and to a degree that the B concentration increases by 1 ppm to 20 ppm as compared with that prior to addition. The upper limit of the added amount of Ti is preferably 30 ppm or less and more preferably 20 ppm or less. In addition, the lower limit of the added amount of Ti is preferably 5 ppm or more, more preferably 7 ppm or more and even more preferably in excess of 10 ppm. If the added amount of Ti is less than 5 ppm, there is the risk of being unable to adequately reduce the size of the crystal grains. In addition, if the added amount of Ti exceeds 20 ppm, there is the risk of increased haze in transparent articles when transparent articles are produced by producing a stamper using such a material. It is necessary that the total amount of elements other than Mg, including this Ti and B as well as the aforementioned unavoidable impurities, be added within a range of 500 ppm or less. The total amount of elements other than Mg is more preferably 100 ppm or less and even more preferably 70 ppm or less.

In addition, it is necessary that elements other than Mg be contained in excess of 10 ppm in total. If unavoidable impurities other than Mg are contained at 10 ppm or less, there is the risk of the crystal grains becoming excessively coarse. In particular, the Ti concentration after adding the refiner is preferably 5 ppm or more, and the content of elements other than Mg, including unavoidable impurities such as Ti or Fe preferably exceeds 10 ppm and is more preferably 15 ppm or more. In addition, although it is necessary to prepare aluminum of extremely high purity in order to make the content of unavoidable impurities 10 ppm or less, preparation of such aluminum is not easy, and leads to a considerable increase in the production cost of an aluminum base die for a stamper as well as the stamper, thereby making this undesirable.

Casting

Since remnants of coarse crystal grains of the ingot remain coarse even after deformation processing and heat treatment, it is important to refine the crystal grains of the ingot. However, the cast structure of highly pure aluminum is coarse, and the crystal grain size thereof is on the centimeter order as can be seen in FIG. 1.

Consequently, in order to refine ingots of aluminum, a refiner such as an Al—Ti—B-based refiner or Al—Ti—C-based refiner is typically added to the melt immediately prior to casting to increase the number of crystal nuclei serving as nuclei of $TiB_2$ particles and TiC particles. For example, when adding an Al—Ti—B-based alloy, the Ti and B inherently contained therein aggregates and loses nearly all of its refining ability. However, in the case of highly pure aluminum having a purity of 99.95% or higher, refining did not occur when an ordinary amount of refiner was added (5 ppm to 100 ppm as the amount of the increase in Ti concentration or 1 ppm to 20 ppm as the amount of the increase in B concentration), and refining still did not occur even at an added amount of 350 ppm for the amount of the increase in Ti concentration or 70 ppm as the amount of the increase in B concentration). Excess addition of refiner leads to increase in second phase particles (TiB$_2$) and causes defects in the surface of the stamper.

On the other hand, although the present alloy uses highly pure aluminum for the raw material, it is not considered to be highly pure aluminum since Mg is added. As a result, fine crystal grains on the order of 200 µm to 500 µm can be obtained using a small amount of refiner on the order of 8 ppm as the amount of increase in T concentration or 2 ppm as the amount of increase in B concentration.

Furthermore, the aluminum base die material for a stamper in the present specification refers to an aluminum alloy after casting but prior to deformation processing.

Deformation Processing

Although heterogeneity attributable to crystal orientation due to refinement of the casting structure as previously described can be diminished, since the crystal grain size is still 200 µm to 500 µm, it does not satisfy the requirement of 100 µm or less that is inconspicuous to the naked eye. Therefore, in order to refine the structure, deformation processing is carried out on the aluminum base die material. Examples of deformation processing include rolling, extruding and open die casting. Although deformation processing may consist of rolling or extruding and the like, since the processing direction is limited in the case of deformation processing methods such as rolling and extruding, crystal grains of the ingot extend in the processing direction in the resulting processed structure, remnants of the processed structure also remain in the processing direction following recrystallization by heat treatment, and this results in the formation of striated structure. Consequently, processing is required to be carried out in two directions or more. On the other hand, open die forging allows the processing direction to be selected as desired, thereby making this preferable since it offers the advantage of forming a random structure free of anisotropy.

In addition, since the processing direction is limited in the case of rolling and extruding, the degree of processing ends up being determined by the material dimensions before deformation processing and the dimensions after processing. On the other hand, since deformation processing is repeatedly carried out by interchanging the processing direction in the case of open die forging, a large degree of processing can be obtained. A larger degree of processing leads to an accumulation of strain that serves as the driving force of recrystallization and the accumulation of this strain serves to further refine the recrystallized structure, and since this contributes to homogeneity of the transfer obtained by using the alumite film as a casting, forging treatment is preferable when desiring to obtain finer crystal grains.

This forging can be broadly classified into hot forging carried out for the purpose of refining and increasing homogeneity by destroying the comparatively coarse cast structure, and cold forging/annealing carried out for the purpose of further refining the material refined by hot forging.

Hot Forging

The preheating temperature is important prior to hot forging, and if the temperature is excessively low, homogeneity cannot be expected to be increased since recrystallization does not occur during forging, while if the temperature is excessively high, crystal growth during preheating becomes pronounced, resulting in the formation of coarse crystal grains and causing their remnants to remain even after cold forging. The preheating temperature is preferably 350° C. to 470° C. and more preferably in the vicinity of 420° C. Hot forging is based on (⅔ U–1.5 S)×3 cycles, and in cases in which greater homogeneity is required, similar hot forging is repeated preheating again. Here, the expressions of ⅔ U and 1.5 S are such that ⅔ U indicates upset forging at ⅔ the forging ratio, while 1.5 S indicates solid forging at 1.5 the forging ratio as defined in JIS. There are no particular limitations on the order of this upset forging and solid forging, and the order thereof may be reversed.

Although a larger number of forging cycles makes it easier to obtain a homogeneous structure, the temperature of the forged material decreases considerably as the forging time increases. If the temperature of the forged material falls below 300° C. due to this drop in temperature, it becomes difficult to induce recrystallization, thereby making it difficult to increase homogeneity, which is the foremost objective of hot forging. Consequently, although it becomes necessary to raise the preheating temperature, raising the preheating temperature results in increased susceptibility to enlargement of crystal grains during this preheating. Consequently, although the greater the number of forging cycles the better, the number of forging cycles is preferably limited to about three. Although the temperature drop during forging can be suppressed by reducing the number of forging cycles in order to lower the preheating temperature, in this case, this reduction in the number of forging cycles in order to obtain a homogeneous structure is compensated for by an increase in the number of cycles of hot forging and reheating, thereby making this industrially unrealistic.

In addition, if the amounts of extend forging and upset forging are increased in the manner of (2 S–½ U)×3 cycles, the accumulation of strain increases even for the same number of cycles, thereby making this advantageous in terms of crystal grain refinement. However, wrinkles on the surface are easily rolled up inside during forging, and these wrinkles appears in the form of defects during subsequent alumite treatment, thereby making this undesirable. In addition, although it also possible to carry out recrystallization by repeating cold forging and annealing instead of recrystallization by hot forging, since this results in an increase in the number of steps, it is industrially unrealistic.

In cases not requiring high homogeneity, since refining is carried out to 200 µm to 500 µM during casting, forging costs can be reduced by being able to omit this hot forging.

Cold Forging

Since the main objective of cold forging is to accumulate strain for refining recrystallized grains, a higher forging ratio is advantageous for refining. However, since cracks form in cases in which the forging ratio is excessively high, it is preferable to use no more than (1.5 S–⅔ U)×2 to 3 cycles in the case of repeating extend forging and upset forging or no more than 2 to 12 S or ½ to 1/12 U in the case of extend forging or upset forging only. In addition, the temperature of the forged material rises due to processing heat during cold forging. In cases in which the temperature exceeds 200° C. when the release of strain is remarkable, cooling by water cooling or cold air cooling is preferable, and it is more preferable to maintain the temperature at 150° C. or lower.

Furthermore, hollow forging may be carried out as necessary by carrying out cold forging while forming a hole in the center of the aluminum alloy with a punch and the like after hot forging. For example, by forming a hole in the center at the end of hot forging to form a hole having an inner diameter of φ508, an inner diameter of φ130 and a length of 433 L, passing a core metal through the inner diameter portion after cooling, and then carrying out cold extend forging for 5.875 to form a hole having an outer diameter of φ240, inner diameter of φ130 and length of 2543 L, the material of the inner diameter portion that is removed in the subsequent machining step is no longer required, thereby making it possible to improve material yield. In addition, there is also the advantage of being able to omit boring processing carried out to remove the center portion in the machining step.

Annealing

Annealing is carried out after forging, and is carried out to induce recrystallization by using strain accumulated by cold forging as the driving force thereof. The temperature during annealing is important because, if the temperature is excessively low, recrystallization does not occur and the processed structure remains. On the other hand, if the annealing temperature is excessively high, grain growth ends up occurring resulting in the formation of large crystal grains. Consequently, the lower limit of the annealing temperature is preferably a temperature of 280° C. or higher at which recrystallization ends, while the upper limit is preferably a temperature of 350° C. or lower at which crystal grain enlargement due to grain growth becomes prominent, and a temperature in the vicinity of 280° C. is even more preferable since crystal grains become increasingly fine.

In this manner, the produced material is used as an aluminum base die by machining and processing into a desired shape.

Furthermore, an aluminum base die for a stamper as referred to in the present specification refers to an aluminum alloy immediately prior to anodic oxidation that has undergone machining and the like following deformation processing. Furthermore, in cases not requiring a high level of homogeneity in the manner of an average crystal grain size of 100 μm or less, an aluminum alloy obtained by a process from which deformation processing has been omitted can be used as an aluminum base die. Although the aluminum base die may be in the form of a plate or roll, a material according to the present invention can be easily obtained in any desired form by machining. In particular, a fine relief structure can be repeatedly transferred making it possible to enhance productivity by machining the aluminum base die into the shape of a roll and subjecting the surface to alumite treatment.

The following provides an explanation of the production of a stamper in which anodized alumina, having a plurality of fine relief structures for which the pitch is equal to or less than the wavelength of visible light, is formed on the surface thereof by anodizing the surface of an aluminum base die.

A method in which the following steps are carried out in the order shown is preferably used for the stamper production method.

(a) First Oxide Film Formation Step:

An oxide film is formed on the surface of a mirror-polished aluminum base die by anodizing the surface in an electrolyte solution at a constant voltage (to also be referred to as step (a)).

(b) Oxide Film Removal Step:

The oxide film is removed to form pore generation sites for anodic oxidation on the surface of the aluminum base die (to also be referred to as step (b)).

(c) Second Oxide Film Formation Step:

The surface of the aluminum base on which pore generation sites have been formed is re-anodized in an electrolyte solution at a constant voltage to form an oxide film having pores corresponding to the pore generation sites in the surface thereof (to also be referred to as step (c)).

(d) Pore Size Enlargement Step:

The diameter of the pores is enlarged (to also be referred to as step (d)).

(e) Repetition Step:

The second oxide film formation step of (c) and the pore size enlargement step of (d) are repeated as necessary (to also be referred to as step (e)).

According to a method comprising steps (a) to (e), tapered pores, having a diameter that gradually narrows from the opening in the direction of depth, are periodically formed in the surface of a mirror-polished aluminum base die, and as a result thereof, a stamper can be obtained in which anodized alumina having a plurality of pores is formed on the surface thereof.

Pretreatment may be carried out prior to step (a) in which the oxide film on the surface of the aluminum base die is removed. A method consisting of immersing in a mixed solution of chromic acid and phosphoric acid, for example, may be employed for the method used to remove the oxide film.

In addition, although regularity of the arrangement of the pores may decrease somewhat, the production method may be carried out starting with step (c) without carrying out step (a) depending on the application of the material to which the surface of the stamper is transferred.

The following provides a detailed explanation of each step.

Figure 10:
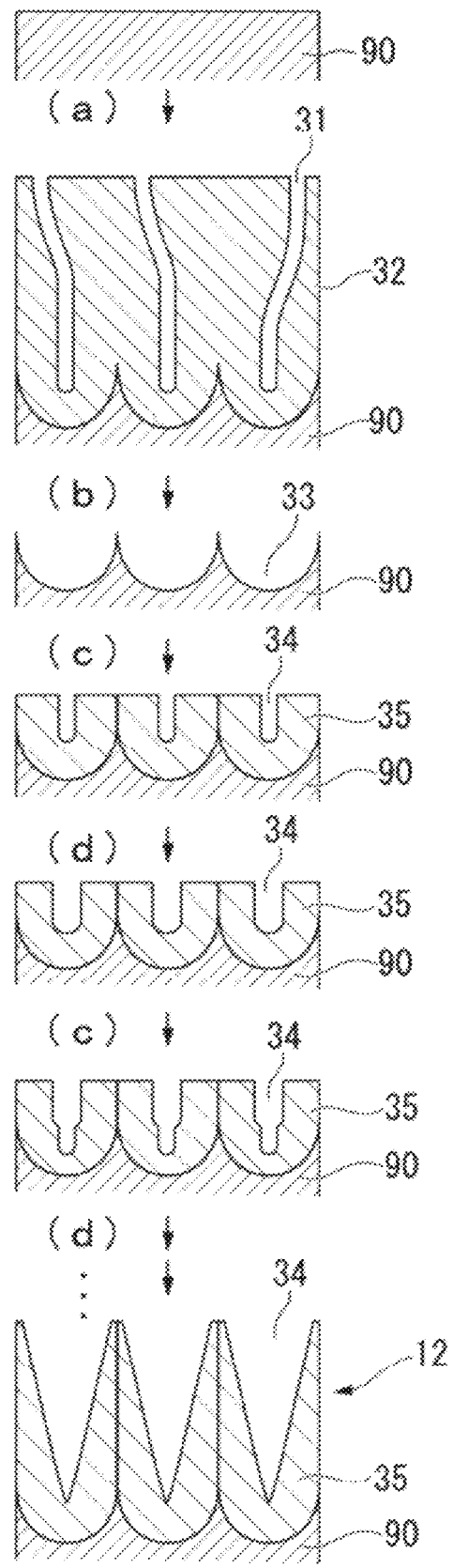
FIG. 10 is a cross-sectional view showing the production process of a stamper having anodic alumina on the surface thereof.

Step (a):

In the first oxide film formation step (a), the mirror-polished surface of an aluminum base die is anodized by immersing in an electrolyte solution at a constant voltage to form an oxide film 32 having pores 31 on the surface of the aluminum base die 90 as shown in FIG. 10.

Examples of the electrolyte solution include an acidic electrolyte solution and an alkaline electrolyte solution, while an acidic electrolyte solution is preferable.

Examples of acidic electrolyte solutions include solutions of oxalic acid, sulfuric acid, phosphoric acid and mixtures thereof.

In the case of using oxalic acid for the electrolyte solution, the concentration of oxalic acid is preferably 0.7 M or less. If the concentration of the oxalic acid exceeds 0.7 M, the current value during anodic oxidation becomes excessively high, thereby causing the surface of the oxide film to become rough.

In addition, by making the voltage during anodic oxidation to be 30 V to 60 V, a stamper can be obtained in which anodized alumina containing highly regular pores having a pitch of about 100 nm is formed on the surface thereof. If the voltage during anodic oxidation is higher than or lower than this range, regularity tends to decrease, and the pitch may become larger than the wavelength of visible light.

The temperature of the electrolyte solution is preferably 60° C. or lower and more preferably 45° C. or lower. If the temperature of the electrolyte solution exceeds 60° C., a phenomenon referred to as "burning" tends to occur that may cause the pores to be destroyed or melt the surface and disturb pore regularity.

In the case of using sulfuric acid for the electrolyte solution, the concentration of the sulfuric acid is preferably 0.7 M or less. If the concentration of the sulfuric acid exceeds 0.7 M, the current value during anodic oxidation becomes excessively high, and a constant voltage may be unable to be maintained.

In addition, by making the voltage during anodic oxidation to be 25 V to 30 V, a stamper can be obtained in which anodized alumina containing highly regular pores having a pitch of about 63 nm is formed on the surface thereof. If the voltage during anodic oxidation is higher than or lower than this range, regularity tends to decrease, and the pitch may become larger than the wavelength of visible light.

The temperature of the electrolyte solution is preferably 30° C. or lower and more preferably 20° C. or lower. If the temperature of the electrolyte solution exceeds 30° C., a phenomenon referred to as "burning" tends to occur that may cause the pores to be destroyed or melt the surface and disturb pore regularity.

In step (a), although regularity of the arrangement of pores can be improved since the thickness of the oxide film formed increases when anodic oxidation is carried out for a long period of time, by making the thickness of the oxide film to be 30 µm or less at that time, the formation of macro surface irregularities attributable to crystal grain boundaries are suppressed, thereby allowing the obtaining of a stamper suitable for production of articles for optical applications. The thickness of the oxide film is more preferably 1 µm to 10 µm and even more preferably 1 µm to 3 µm. The thickness of the oxide film can be observed with, for example, a field emission scanning electron microscope.

Step (b):

As a result of removing the oxide film 32 formed in step (a) following completion of step (a), periodic indentations corresponding to the bottom of the removed oxide film 32 (referred to as a barrier layer), namely pore generation sites 33, are formed.

By temporarily removing the formed oxide film 32 to form pore generation sites 33 of anodic oxidation, the regularity of the ultimately formed pores can be improved (see, for example, Masuda, "Applied Physics", 2000, Vol. 69, No. 5, p. 558).

The oxide film 32 can be removed by, for example, a method consisting of removing with a solution that selectively dissolves alumina without dissolving aluminum. An example of such a solution is a mixed solution of chromic acid and phosphoric acid. Although a method may be employed that removes only a portion of the oxide film 32, completely removing the oxide film 32 in this step makes it possible to form pores having higher regularity.

Step (c):

An aluminum base die 90 on which is formed pore generation sites 33 is re-anodized in an electrolyte solution at a constant voltage to again form an oxide film.

In step (c), anodic oxidation may be carried out under the same conditions as step (a) (electrolyte solution concentration, electrolyte solution temperature, chemical conversion voltage, etc.).

As a result, an oxide film 35 can be formed in which cylindrical pores 34 are formed as shown in FIG. 10. In step (c) as well, although deep pores can be obtained by increasing the duration of anodic oxidation, in the case of producing a stamper that is to be used to produce an article for optical applications such as an anti-reflective article, the thickness of the oxide film here is about 0.01 µm to 0.5 µm, and it is not necessary to form an oxide film at the same thickness as that in step (a).

Step (d):

The diameter of the pores 34 is enlarged as shown in FIG. 10 by carrying out pore size enlargement treatment that serves to increase the diameter of the pores 34 formed in step (c) following completion of step (c).

An example of a specific method used for pore size enlargement treatment consists of immersing in a solution that dissolves alumina to increase the diameter of the pores formed in step (c) by etching. An example of such a solution is an aqueous phosphoric acid solution of about 5% by weight. The diameter of the pores increases the longer the duration of step (d).

Step (e):

In this step, step (c) is again carried out to obtain a cylindrical shape for the pores 34 having two different diameters, followed by again carrying out step (d) as shown in FIG. 10. As a result of carrying out this repetition step (e) consisting of repeatedly carrying out step (c) and step (d) in this manner, the pores 34 can be given a tapered shape in which the diameter gradually narrows moving in the direction of depth from the opening, and as a result thereof, a stamper 12 can be obtained in which anodized alumina having a plurality of periodic pores is formed on the surface thereof.

Pores of various shapes can be formed by suitably setting the conditions of steps (c) and (d), such as the duration of anodic oxidation and the duration of pore size enlargement treatment. Accordingly, these conditions may be suitably set corresponding to the application and so forth of the article to be produced with the stamper. For example, roughly conical pores can be obtained by frequently repeating the anodic oxidation step and the etching step at short intervals. In addition, inverted bell-shaped pores or a relief structure having a pointed shape can be formed by adjusting the durations of the anodic oxidation step and the etching step, thereby making it possible to produce a stamper having a suitably altered shape. In addition, in the case this stamper is to be used to produce an anti-reflective article such as an anti-reflective film, the pitch and depth of the pores can be suitably modified by suitably setting conditions in this manner, thereby making it possible to design optimum changes in the refractive index.

As a result of having a large number of periodic pores formed therein, a stamper produced in this manner has a fine relief structure on the surface thereof. If the pitch of the pores in this fine relief structure is equal to or less than the wavelength of visible light, namely 400 nm or less, a so-called moth's eye structure results.

The pitch is the distance from the center of an indentation (pore) of the fine relief structure to the center of an adjacent indentation (pore).

Since a pitch greater than 400 nm causes scattering of visible light, an adequate anti-reflection function is not demonstrated, thereby preventing this from being suitable for production of anti-reflective articles such as an anti-reflective film.

In the case the stamper is to be used to produce an anti-reflective article such as an anti-reflective film, in addition to the pitch of the pores preferably being equal to or less than the wavelength of visible light, the depth of the pores is preferably 50 nm or more and more preferably 100 nm or more.

Depth is the distance from the opening of an indentation (pore) of the fine relief structure to the deepest portion thereof.

If the depth of the pores is 50 nm or more, the reflectance of the surface of the article for optical applications formed by transferring the surface of the stamper, namely the transfer surface, decreases.

In addition, the aspect ratio (depth/pitch) of the stamper pores is preferably 1.0 to 4.0, more preferably 1.3 to 3.5, even more preferably 1.8 to 3.5, and most preferably 2.0 to 3.0. If the aspect ratio is 1.0 or more, a transfer surface having low reflectance can be formed, and dependency on incident angle and wavelength can be held to adequately low levels. If the aspect ratio exceeds 4.0, the mechanical strength of the transfer surface tends to decrease.

The surface of the stamper on which the fine relief pattern is formed may be subjected to mold release treatment to facilitate mold release. Examples of methods used to carry out mold release treatment include a method consisting of coating with a silicone-based polymer or fluorine polymer, a method consisting of vapor deposition of a fluorine compound, and a method consisting of coating with a fluorine-based or fluorine-silicone-based silane coupling agent.

<Article Production Method>

A method used to produce an article having a fine relief structure on the surface thereof using the stamper of the present invention is a method in which the fine relief structure on the surface of the stamper of the present invention is transferred to the surface of a transparent base material. More specifically, in this method, an active energy beam-curable resin composition is filled between the stamper of the present invention and a transparent base material, the resin is then cured by irradiating with an active energy beam, a cured resin layer to which the fine relief structure of the stamper has been transferred is formed on the surface of the transparent base material, and the transparent base material having the cured resin layer formed on the surface thereof is then separated from the stamper (so-called optical imprinting method).

(Transparent Base Material)

Examples of the form of the base material include a film, sheet, extrusion molded article and press-molded article.

Examples of the material of the base material include polycarbonate, polystyrene-based resin, polyester, acrylic resin, cellulose-based resin (such as triacetyl cellulose), polyolefin and glass.

(Production Device)

Figure 11:
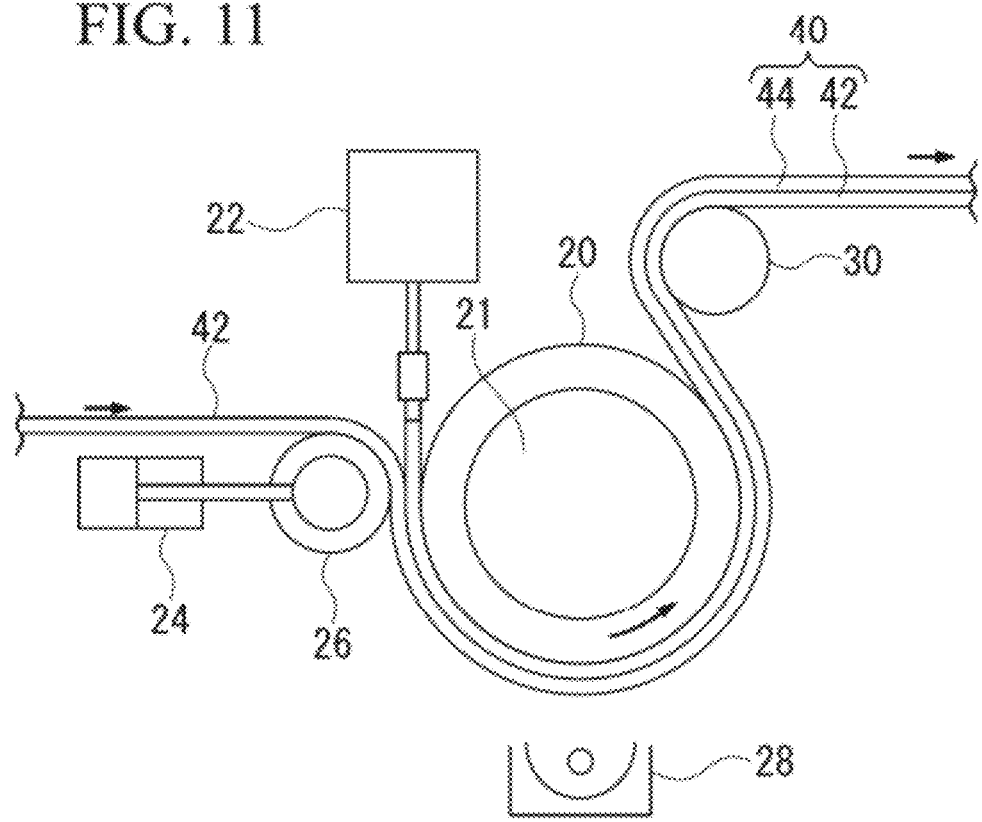
FIG. 11 is a cross-sectional view showing an example of a production device for an anti-reflective film used in an anti-reflective article of the present invention.

An article having a fine relief structure on the surface thereof is produced in the manner described below using, for example, the production device shown in FIG. 11.

An active energy beam-curable resin composition is supplied from a tank 22 between a roll-shaped stamper 20 having a fine relief structure (not shown) on the surface thereof and a belt-shaped film 42 (transparent base material) that moves along the surface of the roll-shaped stamper 20.

The film 42 and the active energy beam-curable resin composition are nipped between the roll-shaped stamper 20 and a nip roller 26 for which nip pressure is adjusted by a pneumatic pressure cylinder 24, and simultaneous to the active energy beam-curable resin composition uniformly passing between the film 42 and the roll-shaped stamper 20, the resin composition is filled inside the fine relief structure of the roll-shaped stamper 20.

By then radiating an active energy beam from an active energy beam radiation device 28 installed below the roll-shaped stamper 20 onto the active energy beam-curable resin composition that passes over the film 42 and curing the active energy beam-curable resin composition, a cured resin layer 44 is formed to which the fine relief structure on the surface of the roll-shaped stamper 20 has been transferred.

An article 40 having a fine relief structure on the surface thereof is then obtained by separating the film 42 on which the cured resin layer 44 has been formed on the surface thereof from the roll-shaped stamper 20 with a separating roller 30.

A high-pressure mercury lamp or metal halide lamp and the like is preferably used for the active energy beam radiation device 28, and the amount of radiant energy in this case is preferably 100 mJ/cm$^2$ to 10,000 mJ/cm$^2$.

The film 42 is an optically transparent film. Examples of materials of the film include acrylic resin, polycarbonate, styrene-based resin, polyester, cellulose-based resin (such as triacetyl cellulose), polyolefin and alicyclic polyolefin.

The cured resin layer 44 is a film composed of a cured product of the active energy beam-curable resin composition to be subsequently described, and has a fine relief structure on the surface thereof.

The fine relief structure on the surface of the article 40 in the case of using a stamper of anodized alumina is formed by transferring the fine relief structure on the surface of the anodized alumina, and has a plurality of protrusions 46 that are composed of the cured product of the active energy beam-curable resin composition.

The fine relief structure is preferably a so-called moth's eye structure in which a plurality of projections (protrusions) having a roughly conical shape or pyramidal shape are arranged. In a moth's eye structure, the interval between projections is equal to or less than the wavelength of visible light, and is known to be an effective means of preventing reflection as a result of continuously increasing the refractive index from the refractive index of air to the refractive index of the material.

The average interval between protrusions is preferably equal to or less than the wavelength of visible light, namely 400 nm or less. In the case of forming protrusions using a stamper of anodized alumina, since the average interval between protrusions is about 100 nm, it is more preferably 200 nm or less and particularly preferably 150 nm or less.

From the viewpoint of facilitating protrusion formation, the average interval between protrusions is preferably 20 nm or more.

The average interval between protrusions is determined by measuring the interval between adjacent protrusions (distance from the center of a protrusion to the center of an adjacent protrusion) by observing with an electron microscope at 50 points, followed by averaging those values.

In the case of an average interval of 100 nm, the height of the protrusions is preferably 80 nm to 500 nm, more preferably 120 nm to 400 nm and particularly preferably 150 nm to 300 nm. If the height of the protrusions is 80 nm or more, reflectance is adequately low and the wavelength dependency of reflectance is also low. If the height of the protrusions is 500 nm or less, scratch resistance of the protrusions is favorable.

The height of the protrusions is a value obtained by measuring the distance from the apex of the protrusions to the lowermost portion of the protrusions present between protrusions when observed with an electron microscope at a magnification factor of 30000×.

The aspect ratio of the protrusions (protrusion height/average interval between protrusions) is preferably 0.5 to 5.0, more preferably 0.8 to 4.5 and particularly preferably 1.2 to 4.0. If the aspect ratio of the protrusions is 0.5 or more, the resulting anti-reflective article can be adequately used as an ultra-hydrophilic film or ultra-water-repellent film. If the aspect ratio of the protrusions is 5.0 or less, the scratch resistance of the protrusions is favorable.

The shape of the protrusions is preferably such that the shape for which the cross-sectional area of the protrusions in a direction perpendicular to the direction of height continuously increases from the uppermost surface in the direction of depth, or in other words, the cross-sectional shape of the protrusions in the direction of height, is triangular, trapezoidal or in the shape of an inverted bell.

In the case of producing a low-reflection article, the difference between the refractive index of the cured resin layer 44 and the refractive index of the film 42 is preferably 0.2 or less, more preferably 0.1 or less and particularly preferably 0.05 or less. If the difference between refractive indices is 0.2 or less, reflection at the interface between the cured resin layer 44 and the film 42 is inhibited. The difference between refractive indices is preferably as small as possible.

In the case of having a fine relief structure on the surface thereof, ultra-water repellency is known to be obtained due to the lotus effect if the surface is formed from a hydrophobic material, while a ultra-hydrophilicity is known to be obtained if the surface is formed from a hydrophilic material.

The water contact angle of the fine relief structure in the case the material of the cured resin layer 44 is hydrophobic is preferably 90° or more, more preferably 110° or more and particularly preferably 120° or more. If the water contact angle is 90° or more, adherence of water contaminants becomes difficult, thereby making it possible to demonstrate adequate contamination resistance. In addition, since it difficult for moisture to adhere, prevention of icing can be expected. In the case of water-repellent products, the contact angle is preferably as large as possible.

The water contact angle of the surface of the fine relief structure in the case the material of the cured resin layer 44 is hydrophilic is preferably 25° or less, more preferably 23° or less and particularly preferably 21° or less. If the water contact angle is 25° or less, contaminants adhered to the surface are rinsed off with water, and since it is difficult for oil contaminants to adhere, adequate contamination resistance is demonstrated. From the viewpoint of inhibiting deformation of the fine relief structure due to absorption of water by the resin cured layer 44 and the accompanying increase in reflectance, the water contact angle is preferably 3° or more and more preferably 5° or more.

In addition, in the case of using an article having a fine relief structure on the surface thereof in an optical application such as a display device, the haze value of the article is preferably 1.5% or less and more preferably 1.3% or less.

(Active Energy Beam-Curable Resin Composition)

The active energy beam-curable resin composition contains a polymerizable compound and a polymerization initiator.

Examples of polymerizable compounds include monomers, oligomers and reactive monomers having radical polymerizable bonds and/or cationic polymerizable bonds in a molecule thereof.

Examples of monomers having radical polymerizable bonds include monofunctional monomers and polyfunctional monomers.

Examples of monofunctional monomers include (meth)acrylate derivatives such as methyl (meth)acrylate, ethyl (meth)acrylate, propyl(meth)acrylate, n-butyl (meth)acrylate, i-butyl (meth)acrylate, s-butyl(meth)acrylate, t-butyl (meth)acrylate, 2-ethylhexyl(meth)acrylate, lauryl(meth)acrylate, alkyl(meth)acrylate, tridecyl(meth)acrylate, stearyl (meth)acrylate, cyclohexyl(meth)acrylate, benzyl (meth)acrylate, phenoxyethyl(meth)acrylate, isobornyl(meth)acrylate, glycidyl(meth)acrylate, tetrahydrofurfuryl(meth)acrylate, allyl(meth)acrylate, 2-hydroxyethyl(meth)acrylate, hydroxypropyl(meth)acrylate, 2-methoxyethyl(meth)acrylate or 2-ethoxyethyl(meth)acrylate; (meth)acrylic acid, (meth)acrylonitrile; styrene, styrene derivatives such as α-methylstyrene; (meth)acrylamide and (meth)acrylamide derivatives such as N-dimethyl(meth)acrylamide, N-diethyl (meth)acrylamide or dimethylaminopropyl(meth)acrylamide. One type of these may be used alone or two or more types may be used in combination.

Examples of polyfunctional monomers include bifunctional monomers such as ethylene glycol di(meth)acrylate, tripropylene glycol di(meth)acrylate, isocyanuric acid ethylene oxide-modified di(meth)acrylate, triethylene glycol di(meth)acrylate, diethylene glycol di(meth)acrylate, neopentyl glycol di(meth)acrylate, 1,6-hexanediol di(meth)acrylate, 1,5-pentanediol di(meth)acrylate, 1,3-butylene glycol di(meth)acrylate, polybutylene glycol di(meth)acrylate, 2,2-bis(4-(meth)acryloxypolyethoxyphenyl) propane, 2,2-bis(4-(meth)acryloxyethoxyphenyl) propane, 2,2-bis(4-(3-(meth)acryloxy-2-hydroxypropoxy)phenyl) propane, 1,2-bis(3-(meth)acryloxy-2-hydroxypropoxy)ethane, 1,4-bis(3-(meth)acryloxy-2-hydroxypropoxy) butane, dimethyloltricyclodecane di(meth)acrylate, ethoxylated bisphenol A di(meth)acrylate, propoxylated bisphenol A di(meth)acrylate, hydroxypivalic acid neopentyl glycol di(meth)acrylate, divinylbenzene or methylenebisacrylamide; trifunctional monomers such as pentaerythritol tri(meth)acrylate, trimethylolpropane tri(meth)acrylate, ethoxylated trimethylolpropane tri(meth)acrylate, propoxylated trimethylolpropane tri(meth)acrylate, ethoxylated trimethylolpropane triacrylate or isocyanuric acid ethylene oxide-modified tri(meth)acrylate; tetrafunctional or higher monomers such as condensation reaction mixtures of succinic acid, trimethylolethane and acrylic acid, dipentaerythritol hexa(meth)acrylate, dipentaerythritol penta(meth)acrylate, ditrimethylolpropane tetraacrylate or tetramethylolmethane tetra(meth)acrylate; bifunctional or higher urethane acrylates, and bifunctional or higher polyester acrylates. One type of these may be used alone or two or more types may be used in combination.

Examples of monomers having cationic polymerizable bonds include monomers having an epoxy group, oxetanyl group, oxazolyl group or vinyloxy group, and monomers having an epoxy group are particularly preferable.

Examples of oligomers or reactive polymers include unsaturated polyesters such as condensates of unsaturated dicarboxylic acids and polyvalent alcohols, polyester(meth)acrylate, polyether(meth)acrylate, polyol(meth)acrylate, epoxy (meth)acrylate, urethane(meth)acrylate, cationic polymer epoxy compounds, and homopolymers or copolymers of the aforementioned monomers having a radical polymerizable bond in a side chain thereof.

In the case of using a photocuring reaction, examples of photopolymerization initiators include carbonyl compounds such as benzophenone, benzoin methyl ether, benzoin ethyl ether, benzoin propyl ether, benzoin isobutyl ether, benzyl, benzophenone, p-methoxybenzophenone, 2,2-diethoxyacetophenone, α,α-dimethoxy-α-phenylacetophenone, methylphenylglyoxylate, ethylphenylglyoxylate, 4,4'-bis(dimethylamino)benzophenone or 2-hydroxy-2-methyl-1-phenylpropan-1-one; sulfur compounds such as tetramethylthiuram monosulfide or tetramethylthiuram disulfide; 2,4,6-trimethylbenzoyldiphenylphosphine oxide and benzoyldiethoxyphosphine oxide. One type of these may be used alone or two or more types may be used in combination.

In the case of using a electron beam curing reaction, examples of polymerization initiators include thioxanthones such as benzophenone, 4,4-bis(diethylamino)benzophenone, 2,4,6-trimethylbenzophenone, methylorthobenzoyl benzoate, 4-phenylbenzophenone, t-butylanthraquinone, 2-ethylanthraquinone, 2,4-diethylthioxanthone, isopropylthioxanthone or 2,4-dichlorothioxanthone; acetophenones such as diethoxyacetophenone, 2-hydroxy-2-methyl-1-phenylpropan-1-one, benzyl dimethyl ketal, 1-hydroxycyclohexyl phenyl ketone, 2-methyl-2-morpholino(4-thiomethylphenyl) propan-1-one or 2-benzyl-2-dimethylamino-1-(morpholinophenyl) butanone; benzoin ethers such as benzoin methyl ether, benzoin ethyl ether, benzoin isopropyl ether or benzoin isobutyl ether; acylphosphine oxides such as 2,4,6-trimethylbenzoyldiphenylphosphine oxide, bis(2,6-dimethoxybenzoyl)-2,4,4-trimethylpentylphosphine oxide or bis(2,4,6-trimethylbenzoyl)-phenylphosphine oxide; methylbenzoylformate, 1,7-bisacridylheptane and 9-phenylacridine. One type of these may be used alone or two or more types may be used in combination.

In the case of using a thermocuring reaction, examples of thermopolymerization initiators include organic peroxides such as methyl ethyl ketone peroxide, benzoyl peroxide, dicumyl peroxide, t-butyl hydroperoxide, cumene hydroperoxide, t-butyl peroxyoctoate, t-butyl peroxybenzoate or lauroyl peroxide; azo compounds such as azobisisobutyronitrile; and redox polymerization initiators combining an amine such as N,N-dimethylaniline or N,N-dimethyl-p-toluidine with the aforementioned organic peroxides.

The amount of polymerization initiator is preferably 0.1 parts by weight to 10 parts by weight based on 100 parts by weight of the polymerizable compound. If the amount of the polymerization initiator is less than 0.1 parts by weight, polymerization proceeds with difficulty. If the amount of the polymerization initiator exceeds 10 parts by weight, the cured film may be colored or mechanical strength may decrease.

The active energy beam-curable resin composition may also contain a non-reactive polymer, active energy beam sol-gel reactive composition, antistatic agent, additive such as a fluorine compound for improving contamination resistance, fine particles or a small amount of solvent as necessary.

Examples of non-reactive polymers include acrylic resin, styrene resin, polyurethane, cellulose resin, polyvinyl butyral, polyester and thermoplastic elastomers.

Examples of active energy beam-curable resin compositions include alkoxysilane compounds and alkylsilicate compounds.

Examples of alkoxysilane compounds include tetramethoxysilane, tetra-i-propoxysilane, tetra-n-propoxysilane, tetra-n-butoxysilane, tetra-sec-butoxysilane, tetra-t-butoxysilane, methyltriethoxysilane, methyltripropoxysilane, methyltributoxysilane, dimethyldimethoxysilane, dimethyldiethoxysilane, trimethylethoxysilane, trimethylmethoxysilane, trimethylpropoxysilane and trimethylbutoxysilane.

Examples of alkyl silicate compounds include methylsilicate, ethylsilicate, isopropylsilicate, n-propylsilicate, n-butylsilicate, n-pentylsilicate and acetylsilicate.

(Hydrophobic Material)

In order to make the water contact angle of the surface of the fine relief structure of the cured resin layer 90° or more, it is preferable to use a composition containing a fluorine-containing compound or a silicone-based compound for the active energy beam-curable resin composition that is able to form a hydrophobic material.

Fluorine-Containing Compounds:

Examples of fluorine-containing compounds include fluorine-containing monomers, fluorine-containing silane coupling agents, fluorine-containing surfactants and fluorine-containing polymers.

Examples of fluorine-containing monomers include fluoroalkyl group-substituted vinyl monomers and fluoroalkyl group-substituted ring-opening polymerizable monomers.

Examples of fluoroalkyl group-substituted vinyl monomers include fluoroalkyl group-substituted (meth)acrylates, fluoroalkyl group-substituted (meth)acrylamides, fluoroalkyl group-substituted vinyl ethers and fluoroalkyl group-substituted styrenes.

Examples of fluoroalkyl group-substituted ring-opening polymerizable monomers include fluoroalkyl group-substituted epoxy compounds, fluoroalkyl group-substituted oxetane compounds and fluoroalkyl group-substituted oxazoline compounds.

Examples of fluorine-containing silane coupling agents include 3,3,3-trifluoropropyltrimethoxysilane, 3,3,3-trifluoropropyltriacetoxysilane, dimethyl-3,3,3-trifluoropropylmethoxysilane and tridecafluoro-1,1,2,2-tetrahydrooctyltriethoxysilane.

Examples of fluorine-containing surfactants include fluoroalkyl group-containing anionic surfactants and fluoroalkyl group-containing cationic surfactants.

Examples of fluorine-containing polymers include polymers of fluoroalkyl group-containing monomers, copolymers of fluoroalkyl group-containing monomers and poly(oxyalkylene) group-containing monomers and copolymers of fluoroalkyl group-containing monomers and crosslinking group-containing monomers. The fluorine-containing polymers may also be copolymers with other copolymerizable monomers.

Silicone-Based Compounds:

Examples of silicone-based compounds include (meth)acrylic modified silicones, silicone resins and silicone-based silane coupling agents.

Examples of (meth)acrylic modified silicones include silicone (di)(meth)acrylate, and for example, Silicone Acrylate "x-22-164" or "x-22-1602" manufactured by Shin-Etsu Chemical Co., Ltd. is used preferably.

(Hydrophilic Material)

In order to make the water contact angle of the surface of the fine relief structure of the cured resin layer 25° or less, a composition at least containing a hydrophilic monomer is preferably used for the active energy beam-curable resin composition that is able to form a hydrophilic material. In addition, from the viewpoints of imparting scratch resistance and water resistance, the composition more preferably contains a crosslinking polyfunctional monomer. Furthermore, the hydrophilic monomer and the crosslinking polyfunctional monomer may be the same (namely, a hydrophilic polyfunctional monomer). Moreover, the active energy beam-curable resin composition may also contain other monomers.

A composition containing a tetrafunctional or higher polyfunctional (meth)acrylate, bifunctional or higher hydrophilic (meth)acrylate and, as necessary, a monofunctional monomer is more preferable for the active energy beam-curable resin composition able to form a hydrophilic material.

Examples of tetrafunctional or higher polyfunctional (meth)acrylates include ditrimethylolpropane tetra(meth)acrylate, pentaerythritol tetra(meth)acrylate, pentaerythritol ethoxytetra(meth)acrylate, dipentaerythritol hydroxypenta (meth)acrylate, dipentaerythritol hexa(meth)acrylate, condensation reaction mixtures of succinic acid, trimethylolethane and acrylic acid at a molar ratio of 1:2:4, urethane acrylates (such as Ebecryl 220, Ebecryl 1290, Ebecryl 1290K, Ebecryl 5129, Ebecryl 8210, Ebecryl 8301 or KRM8200 manufactured by Daicel-Cytec Co., Ltd.), polyether acrylates (such as Ebecryl 81 manufactured by Daicel-Cytec Co., Ltd.), modified epoxy acrylates (such as Ebecryl 3416 manufactured by Daicel-Cytec Co., Ltd.) and polyester acrylates (such as Ebecryl 450, Ebecryl 657, Ebecryl 800, Ebecryl 810, Ebecryl 811, Ebecryl 812, Ebecryl 1830, Ebecryl 845, Ebecryl 846 or Ebecryl 1870 manufactured by Daicel-Cytec Co., Ltd.). One type of these may be used alone or two or more types may be used in combination.

A pentafunctional or higher polyfunctional (meth)acrylate is more preferable for the tetrafunctional or higher polyfunctional (meth)acrylate.

The ratio of the tetrafunctional or higher polyfunctional (meth)acrylate is preferably 10% by weight to 90% by weight, more preferably 20% by weight to 90% by weight, and particularly preferably 30% by weight to 90% by weight, based on the total amount of monomers that compose the active energy beam-curable resin composition. If the ratio of the tetrafunctional or higher polyfunctional (meth)acrylate is 10% by weight or more, elastic modulus is high and scratch resistance is improved. If the ratio of the tetrafunctional or higher polyfunctional (meth)acrylate is 90% by weight or lower, it becomes difficult for small cracks to form in the surface thereby resulting in less susceptibility to the occurrence of appearance defects.

Examples of bifunctional or higher hydrophilic (meth) acrylates include polyfunctional acrylates and polyethylene glycol dimethacrylates having long chain polyethylene glycol such as Aronix M-240 or Aronix M-260 (Toagosei Co., Ltd.) or NK Ester AT-20E or NK Ester ATM-35E (Shin-Nakamura Chemical Co., Ltd.). One type of these may be used alone or two or more types may be used in combination.

In polyethylene glycol dimethacrylate, the total of the average number of repeating units in polyethylene glycol chains present in a molecule thereof is preferably 6 to 40, more preferably 9 to 30 and particularly preferably 12 to 20. If the average number of repeating units in the polyethylene glycol chains is 6 or more, hydrophilicity is adequate and contamination resistance is improved. If the average number of repeating units in the polyethylene glycol side chains is 40 or less, the compatibility with tetrafunctional or higher polyfunctional (meth)acrylates becomes favorable and the active energy beam-curable resin composition is resistant to separation.

The ratio of the bifunctional or higher hydrophilic (meth) acrylate is preferably 3% by weight to 90% by weight and more preferably 3% by weight to 70% by weight based on the total amount of all monomers that compose the active energy beam-curable resin composition. If the ratio of the bifunctional or higher hydrophilic (meth)acrylate is 3% by weight or more, hydrophilicity is adequate and contamination resistance is improved. If the ratio of the bifunctional or higher hydrophilic (meth)acrylate is 90% by weight or less, elastic modulus is high and scratch resistance is improved.

A hydrophilic monofunctional monomer is preferable for the monofunctional monomer.

Examples of hydrophilic monofunctional monomers include monofunctional (meth)acrylates having a polyethylene glycol chain on an ester group, such as M-20G, M-90G or M-230G (Shin-Nakamura Chemical Co., Ltd.), monofunctional (meth)acrylates having a hydroxyl group on an ester group such as hydroxyalkyl(meth)acrylates, and cationic monomers such as monofunctional acrylamides, methyacrylamidopropyltrimethylammonium methyl sulfate or methacryloyloxyethyltrimethylammonium methyl sulfate.

In addition, viscosity adjusters such as acryloyl morpholine or vinylpyrrolidone, and adhesion improvers such as acryloyl isocyanate, which improve adhesion to an article body, and so forth may also be used as monofunctional monomers.

The ratio of monofunctional monomer is preferably 0% by weight to 20% by weight and more preferably 5% by weight to 15% by weight based on the total amount of monomers that compose the active energy beam-curable resin composition. The use of a monofunctional monomer improves adhesion between the base material and the cured resin. If the ratio of monofunctional monomer is 20% by weight or less, contamination resistance or scratch resistance is adequately demonstrated without causing a shortage of tetrafunctional or higher polyfunctional (meth)acrylate or bifunctional or higher hydrophilic (meth)acrylate.

The monofunctional monomer may be incorporated at 0 parts by weight to 35 parts by weight in the active energy beam-curable resin composition as a polymer having a low degree of polymerization obtained by copolymerizing one type or two or more types thereof. Examples of polymers having a low degree of polymerization include 40/60 copolymerized oligomers of monofunctional (meth)acrylates having a polyethylene glycol chain on an ester group such as M-230G (Shin-Nakamura Chemical Co., Ltd.) and methacrylamidopropyltrimethylammonium methyl sulfate (MG polymer, MRC Unitec Co., Ltd.).

EXAMPLES

In the following examples and comparative examples, the resulting processed articles, namely aluminum base dies, were evaluated after etching with an etching solution consisting of HCl, HNO$_3$ and HF at a ratio of 75:25:5.

The aluminum base dies were evaluated for crystal grain size using the numerical integration method. The aluminum base dies were evaluated for second phase particles based on the surface area ratio and quantity of the second phase particles obtained by direct observation by EPMA. Heterogeneity of crystal orientation was evaluated by visual observation of the etching solution.

Furthermore, mirrored surface polishability was evaluated by evaluating hardness instead since materials having high hardness are generally easy to finish to a flat surface.

Example 1

1.04% by weight of Mg was added to aluminum having purity of 99.995% by weight and melted. This melt was cast with a DC casting die measuring 508 mm thick×1110 mm wide to cast an ingot having a length of 3850 mm under forging conditions consisting of a casting temperature of 680° C., casting speed of 52 mm/min and cooling water volume of 230 L/min per meter of die length.

During this casting, a refiner (Al—Ti—B) was continuously added to the melt flowing into the die so that the increase in Ti concentration was 8 ppm and the increase in B concentration was 2 ppm to obtain an ingot in which aluminum purity was 98.96%, Si content was 20 ppm, Fe content was 9 ppm, Ti content was 9 ppm, B content was 4 ppm and the total content of elements other than Mg was 57 ppm. The average crystal grain size at this time was 350 μm and the hardness was 32 HV.

A piece measuring 331 mm×331 mm×508 mm was cut from this ingot and used as a forging material. This forging material was heated to 369° C. followed by carrying out hot forging once consisting of 0.75 U–(1.5 S–⅔ U)×3 cycles and completing forging at 325° C. Next, after again heating to 360° C., hot forging was carried out twice consisting of (1.5 S–⅔ U)×3 cycles and completing forging at 319° C.

After cooling this material to 30° C., cold forging was carried out consisting of (1.5 S–⅔ U)×2 cycles–3.1 S and forging was completed at 173° in a shape measuring ϕ245 mm in diameter×1180 mm wide.

This forging ingot was annealed for 60 minutes at 300° C. after which a piece measuring ϕ240 mm in diameter×20 mm was cut out followed by milling and polishing to obtain a sample for evaluation.

Figure 4:
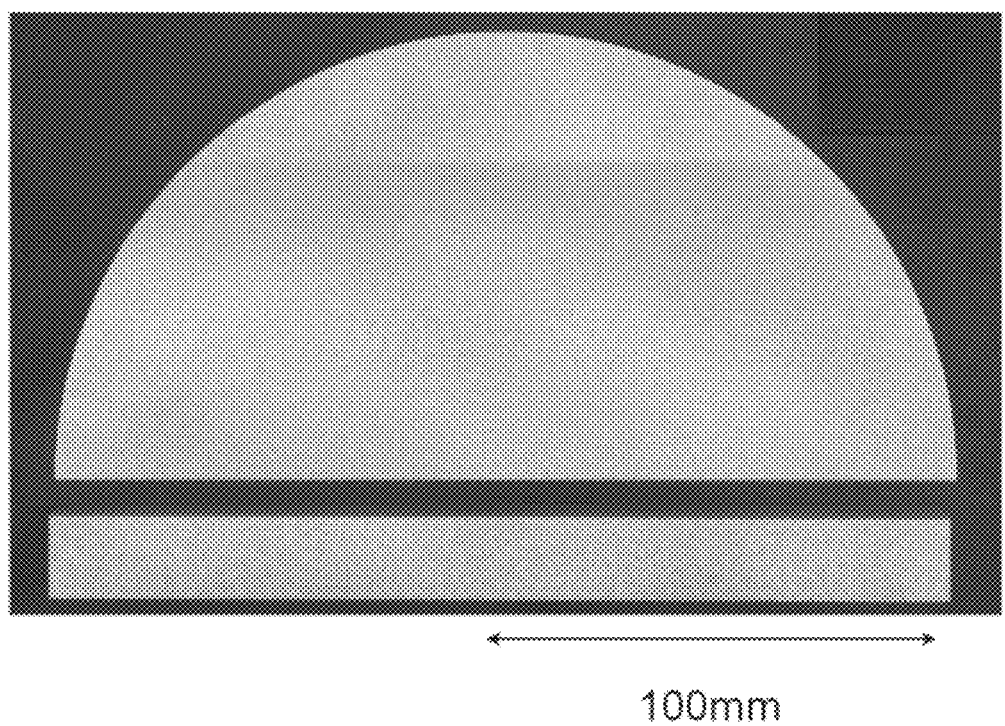
FIG. 4 is a micrograph showing the appearance of a forged material surface after etching in Example 1.

When crystal grain size, second phase particles, crystal orientation heterogeneity and mirrored surface polishability (hardness) were confirmed using the previously described evaluation methods, the sample was found to have adequate fineness, having an average crystal grain size of 37 μm. In addition, the surface area ratio of second phase particles was low at 0.01%. Crystal orientation heterogeneity as shown in FIG. 1 was not observed following etching (see FIG. 4). Hardness was 32 HV.

Example 2

0.63% by weight of Mg was added to aluminum having purity of 99.995% by weight and melted. This melt was cast with a DC casting die measuring 508 mm thick×1110 mm wide to cast an ingot having a length of 3850 mm under forging conditions consisting of a casting temperature of 680° C., casting speed of 52 mm/min and cooling water volume of 230 L/min per meter of die length.

During this casting, a refiner (Al-5% Ti-1% B) was continuously added to the melt flowing into the die so that the increase in Ti concentration was 8 ppm and the increase in B concentration was 2 ppm to obtain an ingot in which aluminum purity was 99.37%, Si content was 26 ppm, Fe content was 9 ppm, Ti content was 5 ppm, B content was 2 ppm and the total content of elements other than Mg was 58 ppm. The average crystal grain size at this time was 560 μm and the hardness was 28 HV.

A piece measuring 331 mm×331 mm×508 mm was cut from this ingot and used as a forging material. The forging ratios of hot forging and cold forging were the same as those of Example 1.

This forging material was heated to 371° C. followed by carrying out hot forging once and completing forging at 294° C. Next, after again heating to 342° C., hot forging was carried out twice and forging was completed at 311° C. After cooling this material to 26° C., cold forging was carried out and completed at 155° in a shape measuring φ245 mm in diameter×1180 mm wide. The forging ratio of this cold forging was the same as that of Example 1.

This forging ingot was annealed for 60 minutes at 300° C. after which a piece measuring φ240 mm in diameter×20 mm was cut out followed by milling and polishing to obtain a sample for evaluation.

Figure 5:
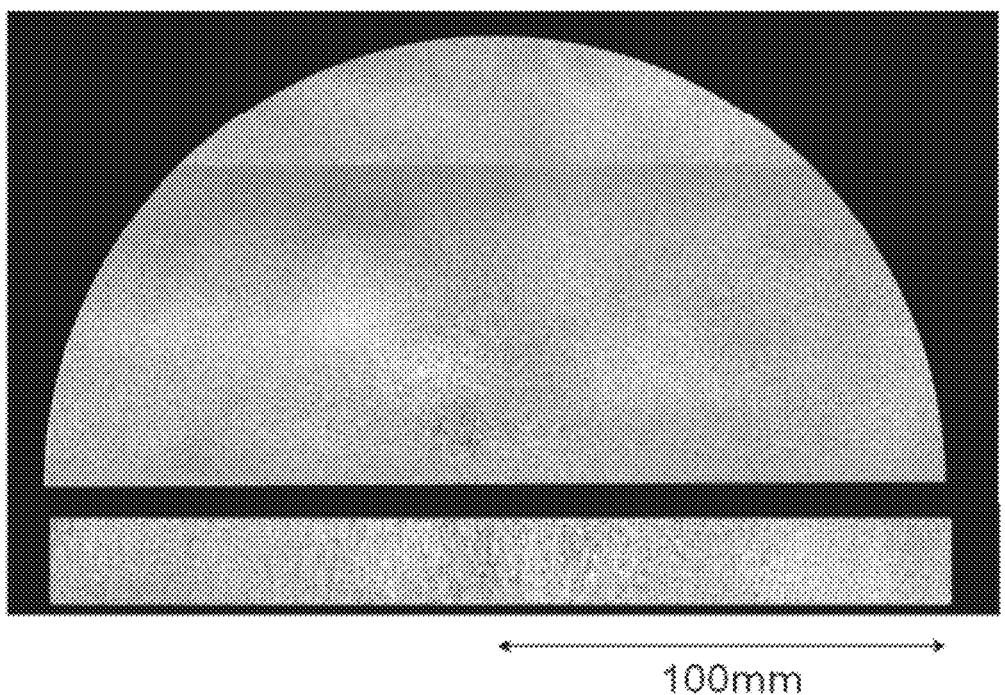
FIG. 5 is a micrograph showing the appearance of a forged material surface after etching in Example 2.

When crystal grain size, second phase particles, crystal orientation heterogeneity and mirrored surface polishability (hardness) were confirmed using the previously described evaluation methods, average crystal grain size was found to be somewhat larger at 41 μm since a smaller amount of Mg was added in comparison with Example 1. In addition, the surface area ratio of second phase particles was low at 0.03%. Although coarser than Example 1 due to the larger crystal grain size, crystal orientation heterogeneity as shown in FIG. 1 was not observed following etching (see FIG. 5). Hardness was 26 HV.

Example 3

Ingot production was carried out under the same production conditions as Example 1, and the average crystal grain size and hardness after casting were the same as Example 1.

A piece measuring 340 mm×370 mm×508 mm was cut from this ingot and used as a forging material, after which hollow forging was carried out using the method described below.

This forging material was heated to 373° C. followed by carrying out hot forging once consisting of 1.185−(⅔ U−1.5 S)×3 cycles and completing forging at 347° C. Next, after again heating to 361° C., hot forging was carried out twice consisting of (⅔ U−⅓ S)×2 cycles to obtain a material measuring φ450 mm in diameter×400 mm, followed by forming a hole in the center with a punch to obtain a material measuring φ427 mm in outer diameter×φ140 mm in inner diameter×400 mm, and completing forging at 329° C.

After cooling this material to 35° C., cold forging was carried out consisting of 5.3 S and forging was completed at 145° in a shape measuring φ235 mm in outer diameter×φ130 mm in inner diameter×2123 mm.

This forging ingot was annealed for 60 minutes at 300° C. after which a piece measuring φ235 mm in outer diameter× φ130 mm in inner diameter×20 mm was cut out followed by milling and polishing to obtain a sample for evaluation.

Figure 6:
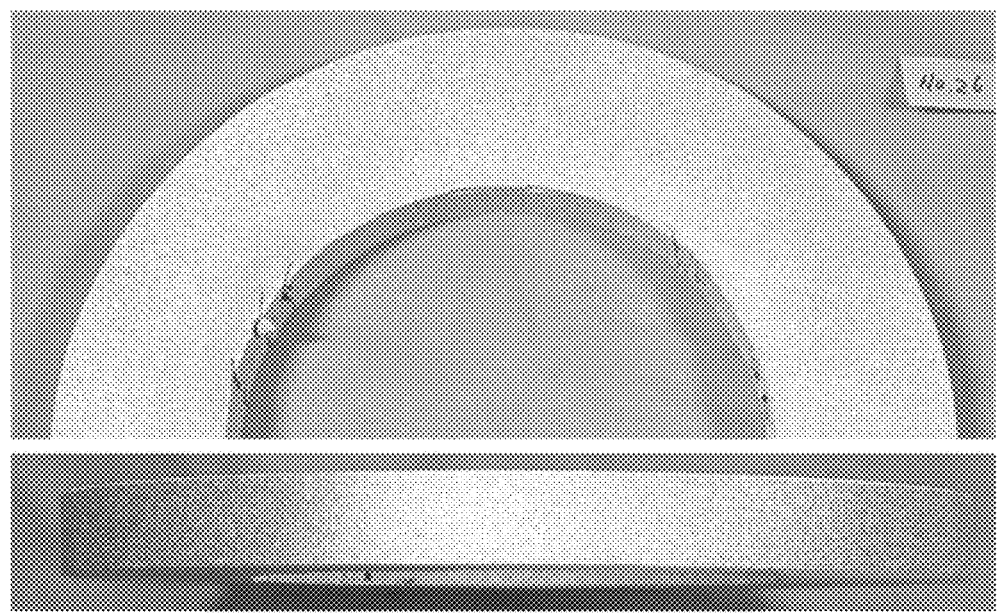
FIG. 6 is a micrograph showing the appearance of a forged material surface after etching in Example 3.

When crystal grain size, second phase particles, crystal orientation heterogeneity and mirrored surface polishability (hardness) were confirmed using the previously described evaluation methods, the sample was found to have adequate fineness, having an average crystal grain size of 38 μm. In addition, the surface area ratio of second phase particles was low at 0.01%. Crystal orientation heterogeneity as shown in FIG. 1 was not observed following etching (see FIG. 6). Hardness was 32 HV.

Aluminum having purity of 99.9% was melted. This melt was cast with a DC casting die measuring 508 mm thick× 1110 mm wide to cast an ingot having a length of 3850 mm under casting conditions consisting of a casting temperature of 680° C., casting speed of 50 mm/min and cooling water volume of 315 L/min per meter of die length.

During this casting, a refiner (Al—Ti—B) was continuously added to the melt flowing into the die so that the increase in Ti concentration was 180 ppm and the increase in B concentration was 36 ppm to obtain an ingot in which aluminum purity was 99.89%, Si content was 275 ppm, Fe content was 501 ppm, Ti content was 75 ppm, B content was 7 ppm and the total content of elements other than Mg was 1062 ppm. The average crystal grain size at this time was 250 μm and the hardness was 16 HV.

A piece measuring 500 mm×500 mm×508 mm was cut from this ingot and used as a forging material.

This forging material was heated to 380° C. followed by carrying out hot forging once consisting of (2 S−½ U)×2 cycles and completing forging at 350° C. Next, after again heating to 380° C., hot forging was carried out twice consisting of (2 S−½ U)×2 cycles and completing forging at 320° C. After cooling this material to 26° C., cold forging was carried out consisting of (2 S−½ U)×2 cycles to obtain a shape measuring φ250 mm in diameter×300 mm×360 mm.

This forging ingot was annealed for 60 minutes at 340° C. after which a piece measuring 20 mm×250 mm×300 mm was cut out followed by milling and polishing to obtain a sample for evaluation.

When crystal grain size, second phase particles, crystal orientation heterogeneity and mirrored surface polishability (hardness) were confirmed using the previously described evaluation methods, the sample was found to have adequate fineness, having an average crystal grain size of 41 μm. However, perhaps due to the total content of elements other than Mg being 500 ppm or more, the surface area ratio of second phase particles was 0.20%, thus failing to satisfy the requirement of 0.10% or less. It is therefore necessary to reduce the content of elements other than Mg in order to lower the number of second phase particles.

Crystal orientation heterogeneity was not observed following etching since a refiner was added during casting. However, since the amount added exceeded the typical amount of refiner added (increase in Ti concentration: 8 ppm, increase in B concentration: 2 ppm), there is concern over an increase in second phase particles (TiB$_2$) attributable to the refiner (see FIG. 6). Hardness was 23 HV.

Comparative Example 2

Aluminum having purity of 99.95% and containing fewer impurities than that of Comparative Example 1 was melted. This melt was cast with a DC casting die measuring 508 mm thick×1110 mm wide to cast an ingot having a length of 3850 mm under casting conditions consisting of a casting temperature of 680° C., casting speed of 52 mm/min and cooling water volume of 230 L/min per meter of die length. The average crystal gain size at this time was on the centimeter order and was extremely coarse. In addition, hardness was 16 HV.

During this casting, a refiner was not added and an ingot was obtained in which aluminum purity was 99.95%, Si content was 205 ppm, Fe content was 161 ppm, Mg content was 0 ppm, Ti content was 1 ppm, B content was 10 ppm and the total content of elements other than Mg was 492 ppm.

A piece measuring 500 mm×500 mm×508 mm was cut from this ingot and used as a forging material.

This forging material was heated to 414° C. followed by carrying out hot forging once consisting of (2 S−½ U)×2 cycles and completing forging at 354° C. Next, after again heating to 393° C., hot forging was carried out twice consisting of (2 S−½ U)×2 cycles and completing forging at 323° C. After cooling this material to 32° C., cold forging was carried out consisting of (2 S−½ U)×2 cycles to obtain a shape measuring φ250 mm in diameter×300 mm×360 mm.

This forging ingot was annealed for 60 minutes at 340° C. after which a piece measuring 20 mm×250 mm×300 mm was cut out followed by milling and polishing to obtain a sample for evaluation.

When crystal grain size, second phase particles, crystal orientation heterogeneity and mirrored surface polishability (hardness) were confirmed using the previously described evaluation methods, the sample was found to have adequate fineness, having an average crystal grain size of 40 μm. In addition, the surface area ratio of second phase particles was 0.08%. The predominant component of these second phase particles was an Al—Fe-based intermetallic compound.

In comparison with Comparative Example 1, the surface area ratio of second phase particles was held to 0.10% or less, and this was the basis for obtaining the favorable results of the total content of elements other than Mg being 500 ppm or less and an Fe content of 200 ppm.

Figure 7:
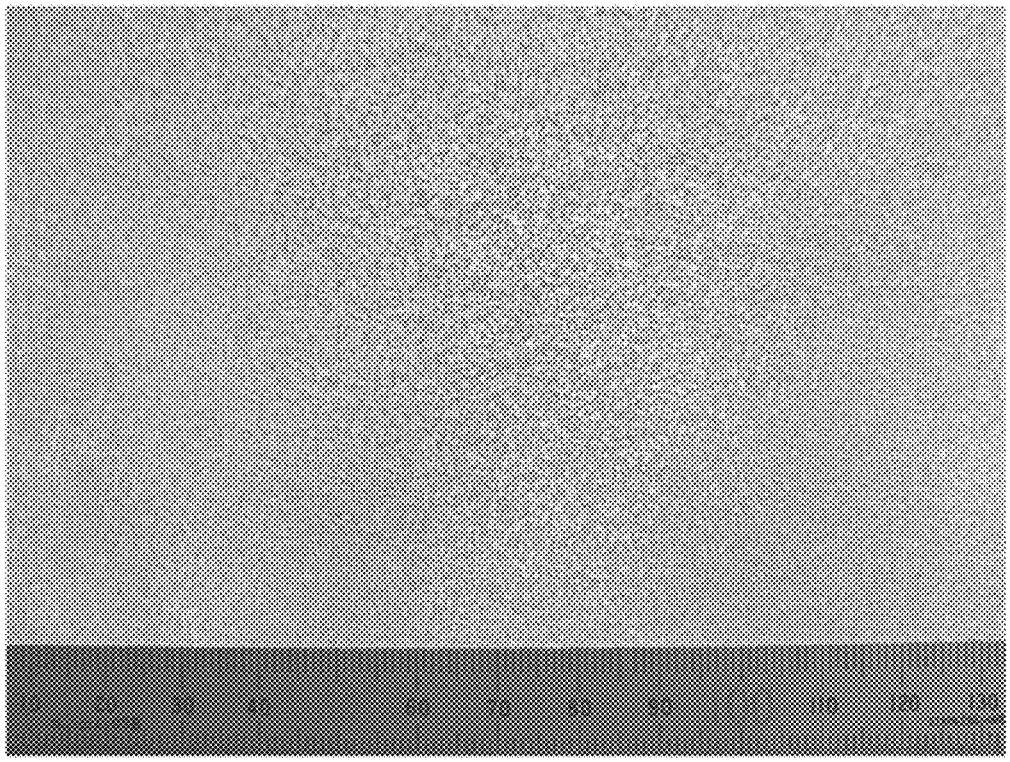
FIG. 7 is a micrograph showing the appearance of a forged material surface after etching in Comparative Example 1.

Since a refiner was not used during casting, remnants of coarse crystal grains during forging casting remained after etching in the form of crystal orientation heterogeneity (see FIG. 7). Hardness was 19 HV.

It can be understood from these comparative examples that even if the total content of elements other than Mg is 500 ppm or less and the surface rate of second phase particles is held to 0.10% or less, if crystal grains are not refined during casting, remnants of the cast structure remain after forging and annealing, thereby preventing the obtaining of a desired base die.

Comparative Example 3

Aluminum having purity of 99.99% containing fewer impurities than that of Comparative Example 2 was melted. This melt was cast with a DC forging cast die measuring 508 mm thick×1110 mm wide to cast an ingot having a length of 3850 mm under forging cast conditions consisting of a casting temperature of 680° C., casting speed of 52 mm/min and cooling water volume of 230 L/min per meter of die length.

During this casting, a refiner was not added and an ingot was obtained in which aluminum purity was 99.99%, Si content was 21 ppm, Fe content was 15 ppm, Mg content was 0 ppm, Ti content was 0 ppm, B content was 0 ppm and the total content of elements other than Mg was 101 ppm. The average crystal grain size at this time was on the centimeter order and was extremely coarse. In addition, hardness was 15 HV.

A piece measuring 500 mm×500 mm×508 mm was cut from this ingot and used as a forging material.

This forging material was heated to 420° C. followed by carrying out hot forging once consisting of (2 S−½ U)×2 cycles and completing forging at 360° C. Next, after again heating to 423° C., hot forging was carried out twice consisting of (2 S−½ U)×2 cycles and completing forging at 356° C.

After cooling this material to 31° C., cold forging was carried out consisting of (2 S−½ U)×2 cycles to obtain a shape measuring φ250 mm in diameter×300 mm×360 mm.

This forging ingot was annealed for 60 minutes at 340° C. after which a piece measuring 20 mm×250 mm×300 mm was cut out followed by milling and polishing to obtain a sample for evaluation.

Figure 8:
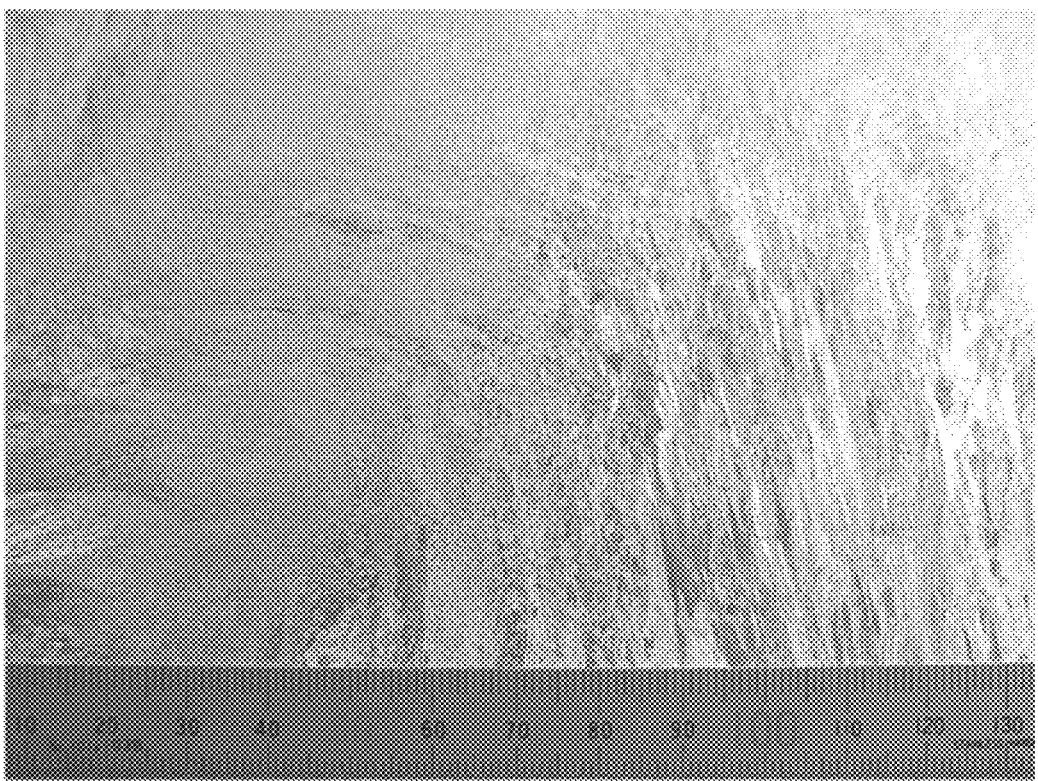
FIG. 8 is a micrograph showing the appearance of a forged material surface after etching in Comparative Example 2.
Figure 9:
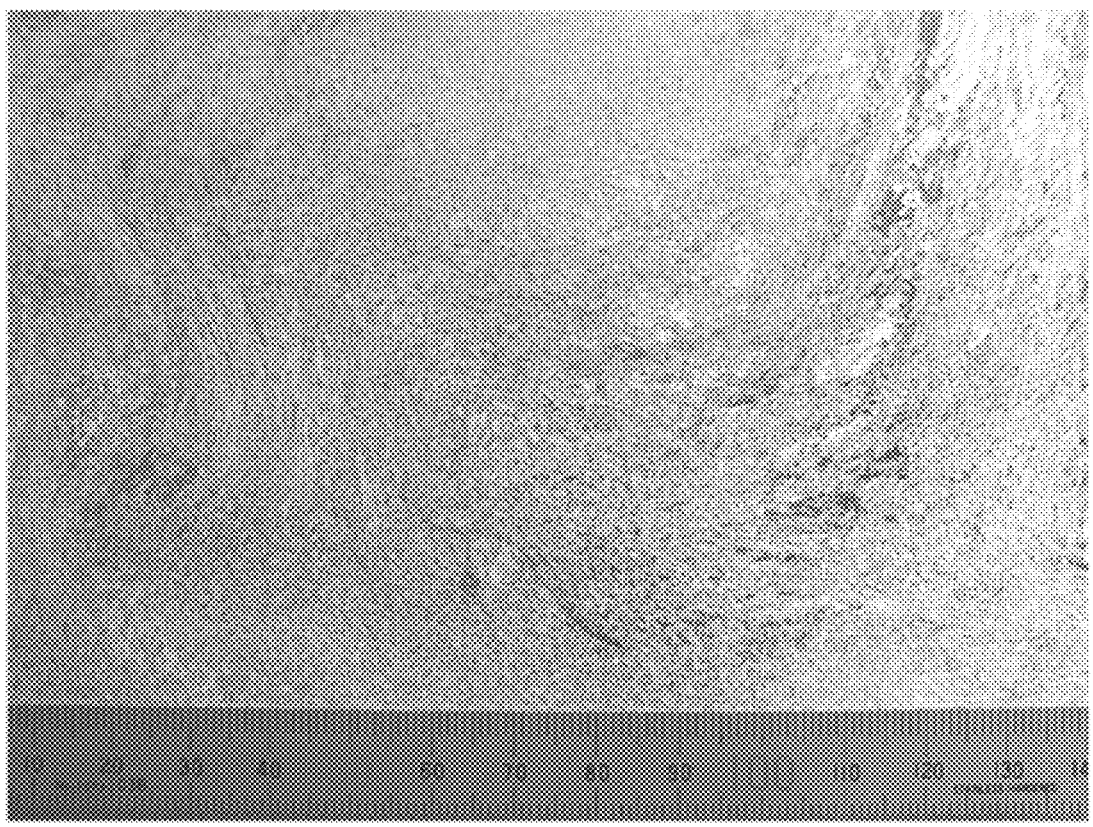
FIG. 9 is a micrograph showing the appearance of a forged material surface after etching in Comparative Example 3.

When crystal grain size, second phase particles, crystal orientation heterogeneity and mirrored surface polishability (hardness) were confirmed using the previously described evaluation methods, the sample was found to have begun to become coarse, having an average crystal grain size of 86 μm. The surface area ratio of second phase particles was 0.01%. Since a refiner was not used during casting, remnants of coarse crystal grains during casting remained after etching in the form of crystal orientation heterogeneity in the same manner as in Comparative Example 2 (see FIG. 8). Hardness was 18 HV.

It can be understood from these comparative examples that there is increased susceptibility to increases in crystal grain size if the aluminum purity is 99.99% or more, thereby demonstrating the need to add an element such as Mg that inhibits increases in crystal grain size.

On the basis of Comparative Examples 1, 2 and 3, it was found that when adding a refiner to a pure aluminum system, a large amount of refiner is required, and when a large amount of refiner has been added, there is the risk of an increase in the number of second phase particles, thereby making this undesirable.

The base due production conditions and evaluation results of the aforementioned examples and comparative examples are collectively shown in Tables 1 to 5.

In Table 5, crystal orientations that were homogeneous and free of non-uniformity were indicated with a "○", while those that were heterogeneous and contained non-uniformity were indicated with a "X".

Example 4

The aluminum fabricated in Example 1 was cut into a cylindrical shape having an outer diameter of 200 mm, inner diameter of 155 mm and length of 350 mm, and mirrored surface grinding was carried out on the surface such that the calculated average roughness Ra of the processed surface was 0.03 μm or less to obtain a cylindrical aluminum base die.

Step (a):

The aluminum base die was anodized for 30 minutes in a 0.3 M aqueous oxalic acid solution under conditions of a bath temperature of 16° C. and direct current of 40 V to form an oxide film (thickness: 3 μm).

Step (b):

The aluminum base die on which the oxide film was formed was immersed for 2 hours in a mixed aqueous solution of 6% by weight phosphoric acid and 1.8% by weight chromic acid controlled to 50° C. to dissolve and remove the formed oxide film.

Step (c):

The resulting aluminum die was again anodized for 45 seconds under the same conditions as in step (a) to form an oxide film.

Step (d):

The aluminum die on which the oxide film was formed was immersed for 9 minutes in a 5% by weight aqueous phosphoric acid solution (30° C.) to carry out pore size enlargement treatment for increasing the diameter of the pores in the oxide film.

Step (e):

The resulting aluminum base die was again anodized for 45 seconds under the same conditions as in step (a).

Step (f): The steps (d) and (e) were repeated a total of four times followed by finally carrying out step (d) to obtain a roll-shaped stamper in which anodic alumina was formed on the surface thereof having roughly conically shaped pores having an average interval of 100 nm and depth of 160 nm.

The roll-shaped stamper obtained in this manner was installed in the production device shown in FIG. 11 and an article was produced in the manner described below.

Each component was mixed in the ratios shown below to prepare an active energy beam-curable resin composition A.

Condensation reaction mixture of succinic acid, trimethylolethane and acrylic acid in a molar ratio of 1:2:4; 45 parts by weight 1,6-hexanediol diacrylate: 45 parts by weight X-22-1602: Radical polymerizable silicone oil (Shin-Etsu Chemical Co., Ltd.): 10 parts by weight 1-hydroxycyclohexyl phenyl ketone (Ciba Specialty Chemicals, Inc., Irgacure 184): 3.0 parts by weight Bis(2,4,6-trimethylbenzoyl)-phenylphosphine oxide (Ciba Specialty Chemicals, Inc., Irgacure 819): 0.2 parts by weight As shown in FIG. 11, the roll-shaped stamper 20 was inserted around a shaft core 21 made of carbon steel for machine parts having a cooling water flow path provided inside. Next, the active energy beam-curable resin composition A was supplied from the tank 22 through a supply nozzle at a prescribed temperature onto the film 42 (polyethylene terephthalate (PET) film, Toyobo Co., Ltd., A4300) nipped between the nip roller 26 and the roll-shaped stamper 20. At this time, the active energy beam-curable resin composition A was also nipped by the nip roller 26, for which nip pressure is adjusted by the pneumatic pressure cylinder 24, and filled into the pores (indentations) of the roll-shaped stamper 20.

Ultraviolet light was radiated from the active energy beam radiation device 28 (240 W/cm ultraviolet radiation device) with the active energy beam-curable resin composition A interposed between the roll-shaped stamper 20 and the film 42 while rotating the roll-shaped stamper 20 at a rotating speed of 7.0 m/min to cure the active energy beam-curable resin composition A and form the cured resin layer 44, followed by separating the film 42 having the cured resin layer 44 formed on the surface thereof from the roll-shaped stamper 20 with the separating roller 30 to obtain the article 40 having a fine relief structure on the surface thereof having a pitch of 100 nm and a protrusion height of 150 nm. The appearance of the resulting article was observed and its haze value was measured. The appearance of the article was confirmed based on whether or not an exterior corresponding to remnants of crystal grains can be observed with the naked eye. The haze value of the article was measured using a haze meter (Suga Test Instruments Co., Ltd.) in compliance with JIS K7361-1. Protrusion height was determined by measuring the distance between the apex of protrusions and lowest portion of indentations present between the protrusions when observed with an electron microscope at a magnification factor of 30,000×. The results are shown in Table 6. Article appearance was evaluated as "⊙" when patterns corresponding to remnants of crystal grains are not observed with the naked eye and there is little color unevenness, evaluated as "◯" when only patterns corresponding to remnants of crystal grains are not observed with the naked eye, and evaluated as "X" when patterns corresponding to remnants of crystal grains are observed with the naked eye. Articles having a haze value of 1.5% or higher were evaluated as "X", while those having a haze value of less than 1.5% were evaluated as "◯"

Example 5

The article 40 having a fine relief structure having a pitch of 100 nm and protrusion height of 200 nm on the surface thereof was obtained using the aluminum fabricated in Example 1 and using the same method as Example 4 with the exception of changing the duration of anodic oxidation in step (c) to 50 seconds and changing the duration of pore size enlargement treatment in step (d) to 8 minutes. The resulting article was observed for appearance and measured for haze value. The results are shown in Table 6.

Example 6

The article 40 having a fine relief structure having a pitch of 100 nm and protrusion height of 200 nm on the surface thereof was obtained using the aluminum fabricated in Example 1 and using the same method as Example 4 with the exception of changing the duration of anodic oxidation in step (c) to 65 seconds and changing the duration of pore size enlargement treatment in step (d) to 9 minutes. The resulting article was observed for appearance and measured for haze value. The results are shown in Table 6.

Example 7

The article 40 having a fine relief structure having a pitch of 100 nm and protrusion height of 150 nm on the surface thereof was obtained using aluminum obtained in the same manner as Example 1 and using the same method as Example 4 with the exception of annealing for 60 minutes at 350° C. The resulting article was observed for appearance and measured for haze value. The results are shown in Table 6.

Example 8

The article 40 having a fine relief structure having a pitch of 100 nm and protrusion height of 120 nm on the surface thereof was obtained using aluminum fabricated in the same manner as Example 2 and using the same method as Example 4 with the exception of changing the duration of anodic oxidation in step (c) to 40 seconds and changing the duration of pore size enlargement treatment in step (d) to 9 minutes. The resulting article was observed for appearance and measured for haze value. The results are shown in Table 6.

Example 9

The article 40 having a fine relief structure having a pitch of 100 nm and protrusion height of 150 nm on the surface thereof was obtained using aluminum obtained in the same manner as Example 2 and using the same method as Example 4 with the exception of annealing for 60 minutes at 350° C. The resulting article was observed for appearance and measured for haze value. The results are shown in Table 6.

Comparative Example 4

The article 40 having a fine relief structure having a pitch of 100 nm and protrusion height of 150 nm on the surface thereof was obtained using the same method as Example 4 with the exception of using the aluminum fabricated in Comparative Example 1. The resulting article was observed for appearance and measured for haze value. The results are shown in Table 6.

Comparative Example 5

The article 40 having a fine relief structure having a pitch of 100 nm and protrusion height of 150 nm on the surface thereof was obtained using the same method as Example 4 with the exception of using the aluminum fabricated in Comparative Example 2. The resulting article was observed for appearance and measured for haze value. The results are shown in Table 6.

Comparative Example 6

The article 40 having a fine relief structure having a pitch of 100 nm and protrusion height of 150 nm on the surface thereof was obtained using the same method as Example 4 with the exception of using the aluminum fabricated in Comparative Example 3. The resulting article was observed for appearance and measured for haze value. The results are shown in Table 6.

TABLE 1

| No. | Purity | Mg Conc. (wt %) | Elements other than Mg (ppm) | | | | |
|---|---|---|---|---|---|---|---|
| | | | Si | Fe | Ti | B | Total |
| Ex. 1 | 98.96 | 1.04 | 20 | 9 | 9 | 4 | 57 |
| Ex. 2 | 99.37 | 0.63 | 26 | 9 | 5 | 2 | 58 |
| Ex. 3 | 98.96 | 1.04 | 20 | 9 | 9 | 4 | 57 |
| Comp. Ex. 1 | 99.89 | 0.0005 | 275 | 501 | 75 | 7 | 1062 |
| Comp. Ex. 2 | 99.95 | 0 | 205 | 161 | 1 | 10 | 492 |
| Comp. Ex. 3 | 99.99 | 0 | 21 | 15 | 0 | 0 | 101 |

TABLE 2

| | Refiner added amt. | | Crystal grain size and hardness of cast and forged structures | | | | |
|---|---|---|---|---|---|---|---|
| No. | Ti increase (ppm) | B increase (ppm) | Temp. (° C.) | Speed (mm/min) | Cooling water volume (L/min/1 m) | Crystal grain size (µm) | Hardness (HV) |
| Ex. 1 | 8 | 2 | 680 | 52 | 230 | 350 | 32 |
| Ex. 2 | 8 | 2 | 680 | 52 | 230 | 560 | 28 |
| Ex. 3 | 8 | 2 | 680 | 52 | 230 | 350 | 32 |
| Comp. Ex. 1 | 180 | 36 | 680 | 50 | 315 | 250 | 16 |
| Comp. Ex. 2 | 0 | 0 | 680 | 52 | 230 | Unable to be measured cm order | 16 |
| Comp. Ex. 3 | 0 | 0 | 680 | 52 | 230 | Unable to be measured cm order | 15 |

TABLE 3

| | Hot Forging - 1st Round | | Hot Forging - 2 Round | |
|---|---|---|---|---|
| No. | System Plan | Temp. (° C.) | System Plan | Temp. (° C.) |
| Ex. 1 | 3/4 U – (1.5 S – 2/3 U) × 3 cycles | 369→325 | (1.5 S – 2/3 U) × 3 cycles | 360→319 |
| Ex. 2 | 3/4 U – (1.5 S – 2/3 U) × 3 cycles | 371→294 | (1.5 S – 2/3 U) × 3 cycles | 342→311 |
| Ex. 3 | 1.18 S – (2/3 U – 1.5 S) × 3 cycles | 373→347 | (2/3 U – 1.5 S) × 2 cycles | 361→329 |
| Comp. Ex. 1 | (2 S – 1/2 U) × 2 cycles | 380→350 | (2 S – 1/2 U) × 2 cycles | 380→320 |
| Comp. Ex. 2 | (2 S – 1/2 U) × 2 cycles | 414→354 | (2 S – 1/2 U) × 2 cycles | 393→323 |
| Comp. Ex. 3 | (2 S – 1/2 U) × 2 cycles | 420→360 | (2 S – 1/2 U) × 2 cycles | 423→356 |

TABLE 4

| | Cold Forging - 1st Round | | Annealing |
|---|---|---|---|
| No. | System Plan | Temp. (° C.) | (° C. × min) |
| Ex. 1 | (1.5 S – 2/3 U) × 2 cycles – 3.1 S | 30→173 | 300 × 60 |
| Ex. 2 | (1.5 S – 2/3 U) × 2 cycles – 3.1 S | 26→155 | 300 × 60 |
| Ex. 3 | 5.3 S | 35→145 | 300 × 60 |
| Comp. Ex. 1 | (2 S – 1/2 U) × 2 cycles | 26→128 | 340 × 60 |
| Comp. Ex. 2 | (2 S – 1/2 U) × 2 cycles | 32→144 | 340 × 60 |
| Comp. Ex. 3 | (2 S – 1/2 U) × 2 cycles | 31→128 | 340 × 60 |

TABLE 5

| No. | Crystal grain size (µm) | Second phase particle surface area ratio (%) | Crystal orientation heterogeneity | Hardness (HV) |
|---|---|---|---|---|
| Ex. 1 | 37 | 0.01 | ◯ | 32 |
| Ex. 2 | 41 | 0.03 | ◯ | 26 |

TABLE 5-continued

| No. | Crystal grain size (μm) | Second phase particle surface area ratio (%) | Crystal orientation heterogeneity | Hardness (HV) |
|---|---|---|---|---|
| Ex. 3 | 38 | 0.01 | ○ | 32 |
| Comp. Ex. 1 | 41 | 0.20 | ○ | 23 |
| Comp. Ex. 2 | 40 | 0.08 | X | 19 |
| Comp. Ex. 3 | 86 | 0.01 | X | 18 |

TABLE 6

| No. | Protrusion pitch (stamper) (nm) | Protrusion height (stamper) (nm) | Projection height (article) (nm) | Appearance | Haze value (measured value) (%) | Haze evaluation |
|---|---|---|---|---|---|---|
| Ex. 4 | 100 | 160 | 150 | ○ | 1.02 | ○ |
| Ex. 5 | 100 | 210 | 200 | ⊚ | 1.13 | ○ |
| Ex. 6 | 100 | 260 | 250 | ⊚ | 1.09 | ○ |
| Ex. 7 | 100 | 160 | 150 | ○ | 0.92 | ○ |
| Ex. 8 | 100 | 130 | 120 | ○ | 0.84 | ○ |
| Ex. 9 | 100 | 160 | 150 | ○ | 0.76 | ○ |
| Comp. Ex. 4 | 100 | 160 | 150 | ○ | 1.66 | X |
| Comp. Ex. 5 | 100 | 160 | 150 | X | 0.81 | ○ |
| Comp. Ex. 6 | 100 | 160 | 150 | X | 0.95 | ○ |

INDUSTRIAL APPLICABILITY

According to the present invention, as a result of limiting the amount of Mg contained in an aluminum melt to 0.5% by weight to 3.0% by weight, and limiting the total amount of elements other than Mg, including unavoidable impurities, to 500 ppm or less, an aluminum ingot can be obtained in which the average crystal grain size is 1000 μm or less and the surface area ratio of second phase particles is 10% or less. An aluminum base die for a stamper is obtained that has fine, uniformly oriented crystal grains and in which the appearance of second phase articles is inhibited by carrying out deformation processing such as forging on this ingot as necessary. Since this base die has high hardness, a smooth surface can be easily formed by surface polishing. If subsequently subjected to anodic oxidation treatment, a relief transfer surface having a uniform pattern free of directivity can easily be formed, and as a result, a highly precise stamper can be provided inexpensively.

BRIEF DESCRIPTION OF THE REFERENCE SYMBOLS

12 Stamper
31 Pores
32 Oxide film
33 Pore generation sites
34 Pores
35 Oxide film
90 Aluminum base die
20 Roll-shaped stamper
21 Shaft core
22 Tank
24 Pneumatic pressure cylinder
26 Nip roller
28 Active energy beam radiation device
30 Separating roller
40 Article
42 Film
44 Cured resin layer

The invention claimed is:

1. An aluminum base die for a stamper having a fine relief structure with periodic pores on the surface thereof where pitch of the pores is 400 nm or less, said aluminum base die having a component composition that contains 0.5% by weight to 3.0% by weight of Mg, and 500 ppm or less of elements other than Mg and Al, including unavoidable impurities, the remainder being composed of Al, and that has a metal structure in which the average crystal grain size is 1000 μm or less and the surface area ratio of second phase particles is 0.10% or less, with said aluminum base die having a hardness of 20 HV to 60 HV.

2. The aluminum base die for a stamper according to claim 1, wherein the content of Fe as an unavoidable impurity is 200 ppm or less and the content of Si is 100 ppm or less.

3. The aluminum base die for a stamper according to claim 1, wherein elements other than Mg and Al, including the unavoidable impurities, are contained in excess of 10 ppm.

4. The aluminum base die for a stamper according to claim 1, wherein the content of Ti is 5 ppm to 20 ppm.

5. The aluminum base die for a stamper according to claim 1, having a metal structure in which the average crystal grain size is made to be 100 μm or less by carrying out deformation processing.

6. The aluminum base die for a stamper according to claim 5, wherein the deformation processing is forging.

7. A stamper having an aluminum die base having a component composition that contains 0.5% by weight to 3.0% by weight of Mg, 500 ppm or less of elements other than Mg and Al, including unavoidable impurities, the remainder being composed of Al, and that has a metal structure in which the average crystal grain size is 1000 μm or less and the surface area ratio of second phase particles is 0.10% or less, and
   an aluminum oxide layer having a fine relief structure with periodic pores on the surface thereof where pitch of the pores is 400 nm or less,
   with said aluminum base die having a hardness of 20 HV to 60 HV.

8. The stamper according to claim 7, wherein the aluminum base die contains elements other than Mg and Al, including unavoidable impurities, in excess of 10 ppm.

9. The aluminum base die for a stamper according to claim 1, wherein the content of Mg is up to 2.0% by weight.

10. The aluminum base die for a stamper according to claim 1, wherein the content of Mg is up to 1.5% by weight.

* * * * *